United States Patent [19]
Ota et al.

[11] Patent Number: 5,379,360
[45] Date of Patent: Jan. 3, 1995

[54] OPTICAL FIBER CONNECTOR AND METHOD OF MANUFACTURING THE SAME

[75] Inventors: Takashi Ota, Kasugai; Masashi Fukuyama, Nagoya, both of Japan

[73] Assignee: NGK Insulators, Ltd., Nagoya, Japan

[21] Appl. No.: 70,619

[22] Filed: Jun. 2, 1993

[30] Foreign Application Priority Data

| Jun. 3, 1992 | [JP] | Japan | 4-142682 |
| Sep. 29, 1992 | [JP] | Japan | 4-259891 |
| Sep. 29, 1992 | [JP] | Japan | 4-259892 |
| Oct. 7, 1992 | [JP] | Japan | 4-268674 |
| Mar. 25, 1993 | [JP] | Japan | 5-66657 |

[51] Int. Cl.⁶ .......................... G02B 6/38
[52] U.S. Cl. .......................... 385/59
[58] Field of Search .................. 385/53–59

[56] References Cited

U.S. PATENT DOCUMENTS

| 4,639,074 | 1/1987 | Murphy | 350/96 |
| 4,657,341 | 4/1987 | Sammueller | 385/59 |
| 4,725,114 | 2/1988 | Murphy | 385/59 |
| 4,818,059 | 4/1989 | Kakii et al. | 385/59 |
| 4,836,638 | 6/1989 | Finzel | 385/59 |
| 4,875,969 | 10/1989 | Hsu et al. | 156/633 |

FOREIGN PATENT DOCUMENTS

0403761A1 12/1990 European Pat. Off. .

OTHER PUBLICATIONS

Patent Abstracts of Japan, vol. 13, No. 96, Mar. 7, 1989 JP-A-63-278004.
Onde Electrique, vol. 61, No. 10, Oct. 1981, pp. 20–21, J. J. Dumont "Les connecteurs Souriau Seérie S1006 à faible perte d'insertion (0,5 dB) pour application Teélé com".

Primary Examiner—Akm E. Ullah
Attorney, Agent, or Firm—Adduci, Mastriani, Schaumberg & Schill

[57] ABSTRACT

Disclosed is an optical fiber connector comprising, (i) a lower plate having a first upper flat surface, a second upper flat surface being lower than the first upper flat surface, and a stepped portion interposed between the first and second upper flat surfaces and having a transversely-extending side surface, (ii) a first upper plate disposable on or above the first upper flat surface and having a bottom flat surface, (iii) at least one longitudinally-extending V-groove, formed in one of the upper flat surface of the lower plate and the bottom surface of the first upper plate, for accommodating respective corresponding optical fibers of an optical fiber cable, and (iv) a second upper plate provided with an accommodation groove having an opening at each end thereof, for accommodating a covering of the optical fiber cable, the second upper plate having an end surface and being disposable on the second upper flat surface so that the end surface contacts the side surface of the stepped portion.

6 Claims, 17 Drawing Sheets

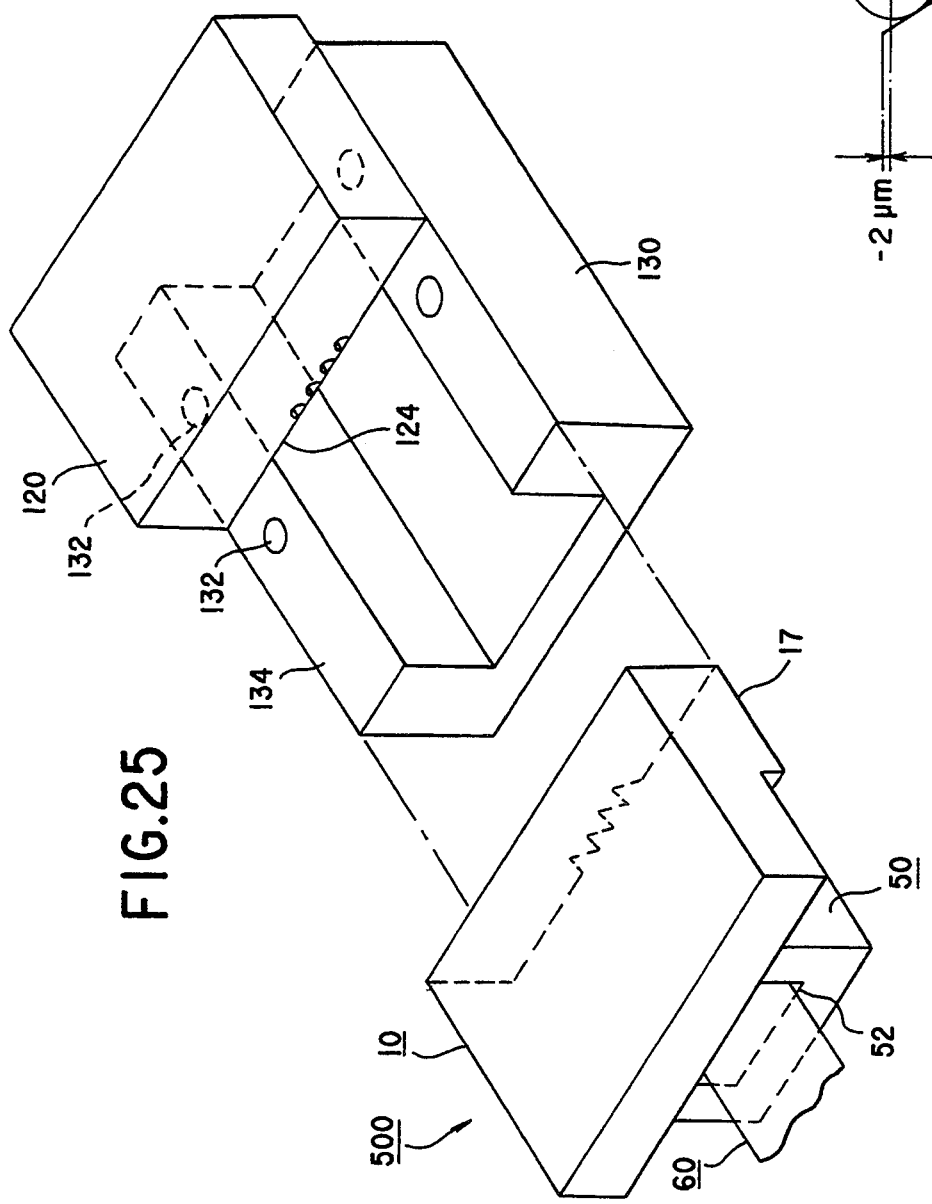
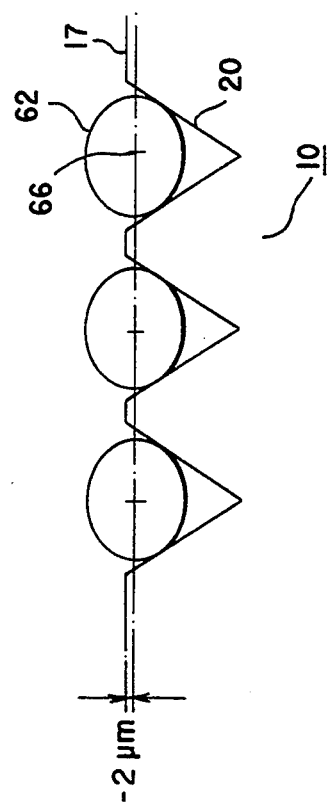
FIG. 25
FIG. 26

5,379,360

OPTICAL FIBER CONNECTOR AND METHOD OF MANUFACTURING THE SAME

BACKGROUND OF THE INVENTION

1. Field of the Invention

The present invention relates to an optical fiber connector and a method of manufacturing the same.

2. Description of the Related Art

Referring to a FIG. 1, a conventional optical fiber connector used for connecting an optical fiber or fibers to an optical element, comprises a lower plate 70 and an upper plate 40. The lower plate 70 is provided with a V-groove 72 for accommodating an optical fiber 62 of an optical fiber cable 60, and a counter-bored portion 74 for accommodating a covering 64 of the fiber cable 60. The upper plate 40 is also provided with a counter-bored portion 74 for accommodating the covering 64 of the fiber cable 60, and an adhesive injection groove 44 communicating with the counter-bored portion 42.

However, the upper plate 40 and the lower plate 70 are made of a hard and brittle material, such as zirconia ceramics and a crystallized glass, and the counter-bored portions 42 and 74 are made by a ultrasonic machining. For this reason, much time and skill are required to perform this counterboring. In addition, to make the counter-bored portions 42 and 74, it is necessary to make the counter-bored portions 42 and 72 one by one, resulting in a lower efficiency in manufacturing. Furthermore, because dimensional and positional accuracies are low, it is necessary to provide counter-bored portions 42 and 74 having sizes larger than optimal for reliable accommodation of the covering 64 of the fiber cable 60.

The assembling is performed by placing the optical fiber cable 60 onto the lower plate 70 and retaining the optical fiber cable 60 by disposing the upper plate 40 on top. In this case, the sizes of the counter-bored portions 42 and 74 are larger than optimal, and for this reason, even though the covering 64 of the fiber cable 60 is put in the counter-bored portion 42, the optical fiber 62 is not necessarily reliably put in the V-groove 72. Moreover, the optical fiber cable 60 itself has a curling nature, and therefore after the optical fiber 62 of the optical fiber cable 60 is located in the V-groove 72, it is necessary to fix the optical fiber cable 60 at a point spaced rearwardly by a several centimeters from the lower plate 70 by a suitable method. Thereafter, the upper plate 40 is placed on the lower plate 70 to retain and fix the optical fiber cable 60. In this case, the upper plate 40 is liable to be displaced relative to the lower plate 70, thereby causing a relative misalignment of the counter-bored portion 42 of the upper plate 40 relative to the V-groove 72 and the counter-bored portion 74 in the lower plate 70.

SUMMARY OF THE INVENTION

It is, therefore, an object of the present invention to provide an optical fiber connector wherein the machining and assembling can be easily performed, and the optical fiber accommodation portion of the upper plate can be accurately positioned relative to the V-groove during assembling, and a method of manufacturing the same.

According to one aspect of the present invention, there is provided an optical fiber connector, comprising:

a lower plate having
  a first upper flat surface,
  a second upper flat surface being lower than the first upper flat surface, and
  a stepped portion interposed between the first and second upper surfaces and having a transversely-extending side surface;
a first upper plate disposable on or above the first upper flat surface and having a bottom flat surface;
at least one longitudinally-extending V-groove, formed in one of the upper flat surface of the lower plate and the bottom surface of the first upper plate, for accommodating respective corresponding optical fibers of an optical fiber cable; and
a second upper plate provided with an accommodation groove having an opening at each end thereof, for accommodating a covering of the optical fiber cable, the second upper plate having an end surface and being disposable on the second upper flat surface of the lower plate so that the end surface contacts the side surface of the stepped portion.

In this optical fiber connector, the first upper flat surface of the lower plate may have the at least one V-groove, and the first upper plate may be an optical fiber holding plate for firmly holding the optical fibers in the corresponding V-groove.

In this case, the lower plate may further includes a reference upper flat surface, and the first upper flat surface and the reference upper flat surface have the same surface.

Alternatively, in this optical fiber connector, the first upper plate may be an optical fiber accommodation plate having the at least one V-groove in the bottom flat surface.

In this optical fiber connector, the second upper plate further preferably includes an adhesive injection groove communicating with the accommodation groove.

According to another aspect of the present invention, there is provided an optical fiber connector, comprising:

a lower plate having
  a first upper flat surface provided with at least one longitudinally-extending V-groove for accommodating respective corresponding optical fiber of an optical fiber cable, and
  a reference upper flat surface, the first upper flat surface and the reference upper flat surface having the same surface; and
an upper plate, disposable on or above the upper flat surface, for firmly holding the optical fiber in the corresponding V-groove, the reference upper flat surface not being covered by the upper plate.

According to still another aspect of the present invention, there is provided a method of fabricating an optical assembly, comprising the steps of:

(a) preparing an optical fiber connector, comprising:
a lower plate having
  a first upper flat surface provided with at least one longitudinally-extending V-groove for accommodating respective corresponding optical fiber of an optical fiber cable, and
  a reference upper flat surface, the first upper flat surface and the reference upper flat surface having the same surface; and
an upper plate, disposable on or above the upper flat surface, the reference upper flat surface not being covered by the upper plate;

(b) positioning the optical fiber in the corresponding V-groove;

(c) firmly holding the optical fiber in the corresponding V-groove by disposing the upper plate on or above the upper flat surface, so as to form an optical fiber assembly; and (d) coupling the optical fiber connector assembly with another optical component using the reference upper flat surface as a positioning reference, thereby forming an optical assembly.

According to still another aspect of the present invention, there is provided a method of manufacturing an optical fiber connector, comprising the steps of:

(a) preparing a wafer having a first upper flat surface;

(b) forming, in the first upper flat surface, a plurality of groups of longitudinally-extending V-grooves, each V-groove for receiving respective corresponding optical fibers of optical fiber cables;

(c) forming, in the first upper flat surface, a second upper flat surface and a stepped portion, the second upper flat surface being lower than the first upper flat surface, the stepped portion having a side surface, and the side surface being interposed between the first and second upper flat surfaces;

(d) forming an integral upper plate formed to fit to the side surface of the stepped portion and to the second upper flat surface;

(e) forming, in the integral upper plate, a plurality of accommodation grooves respectively corresponding to the plurality of groups of longitudinally-extending V-grooves, for accommodating respective corresponding covering of the optical fiber cables, each the accommodation groove having an opening at each end thereof;

(f) positioning and securing the integral upper plate on the second upper flat surface; and (g) cutting the integral upper plate and the wafer together at least in parallel to the extending direction of said V-grooves, so as to form a plurality of optical fiber connector frames respectively having a lower plate provided with the first upper flat surface in which the V-grooves are formed, the second upper flat surface and the stepped potion interposed between the first and second upper flat surfaces, and an upper plate secured on the second upper flat surface and having the accommodation groove.

According to still another aspect of the present invention, there is provided a method of manufacturing an optical fiber assembly, comprising the steps of:

(a) preparing a wafer having a first upper flat surface;

(b) forming, in the first upper flat surface, a plurality of groups of longitudinally-extending V-grooves for accommodating respective corresponding optical fibers of optical fiber cables;

(c) forming, in the first upper flat surface, a second upper flat surface and a stepped portion, the second upper flat surface being lower than the first upper flat surface, the stepped portion having a side surface, and the side surface being interposed between the first and second upper flat surfaces;

(d) forming an integral upper plate formed to fit to the side surface of the stepped portion and to the second upper flat surface;

(e) forming, in the integral upper plate, a plurality of accommodation grooves respectively corresponding to the plurality of groups of longitudinally-extending V-grooves, for accommodating respective corresponding covering of the optical fiber cables, each the accommodation groove having an opening at each end thereof;

(f) positioning and securing the integral upper plate on the second upper flat surface;

(g) respectively inserting optical fiber cables into corresponding the accommodation groove and positioning the optical fiber in the corresponding V-groove;

(h) firmly holding the optical fibers in the corresponding V-grooves by at least one optical fiber holding plate, so as to form an integral optical fiber connector assembly block;

(i) subjecting the assembly block to an end face polishing treatment; and (j) cutting the assembly block at least in parallel to the extending direction of the V-grooves, so as to form a plurality of optical fiber assemblies.

BRIEF DESCRIPTION OF THE DRAWINGS

The above and further objects, features and advantages of the present invention will become more apparent from the following detailed description taken in conjunction with the accompanying drawings, wherein:

FIGS. 24 and 25 are schematic exploded perspective views for explaining an optical fiber assembly and an optical assembly according to a ninth embodiment of the present invention;

FIG. 26 is a front view for explaining an optical fiber assembly according to a ninth embodiment of the present invention;

DESCRIPTION OF THE PREFERRED EMBODIMENTS

Figure 2:
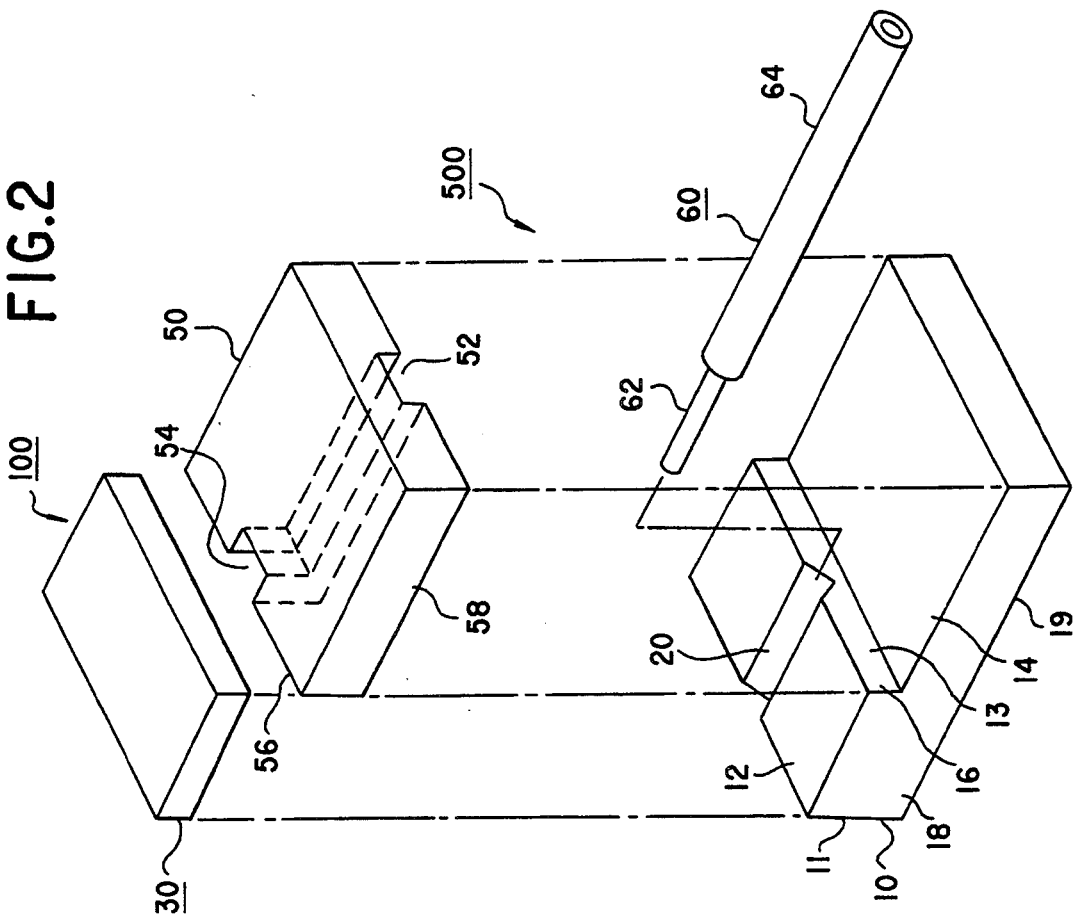
FIG. 2 is a schematic exploded perspective view for explaining an optical fiber connector according to a first embodiment of the present invention.

Referring to FIG. 2, an optical fiber connector according to a first embodiment of the present invention will be explained. The optical fiber connector 100 includes a lower plate 10, an optical fiber holding plate 30 and an upper plate 50. Each of these plates 10, 30 and 50 may be made of a brittle material such as ceramics, a glass and a crystallized glass. It is preferable that at least the optical fiber holding plate 30 and the upper plate 50 are made of a transparent material to enable viewing of the state of the arranged optical fiber cable 60 from the outside and to permit the employment of an ultraviolet-curable type adhesive in some assembling procedures.

The lower plate 10 is provided with an upper flat surface 12, an upper flat surface 14 continuous with the upper flat surface 12, a side surface 13 of a stepped portion 16 interposed therebetween, and a bottom surface 19. The upper flat surface 12, the upper flat surface 14 and the bottom surface 19 are formed to be in a spaced-apart parallel relationship. The upper flat surface 14 is lower than the upper flat surface 12. The side surface 13 is perpendicular to the upper flat surfaces 12 and 14.

In general, a covering 64 of the optical fiber cable 60 has an outside diameter of about 0.4 mm and therefore, the height of the stepped portion 16 (that is, the height difference between the upper flat surface 12 and the upper flat surface 14), is set to about 0.2 mm, so that the optical fiber 62 is located at the center of the V-groove 20, when the covering 64 of the optical fiber cable 60 is placed on the upper flat surface 14.

A V-groove 20 for accommodating an optical fiber 62 of an optical fiber cable 60 is formed in the upper flat surface 12 by a machining process utilizing a grinding stone or the like. The V-groove 20 is parallel to the side wall 18 of the lower plate 10 and is perpendicular to the side wall 13 of the stepped portion 16 and an end surface 11 of the lower plate 10.

The optical fiber holding plate 30 is adapted to firmly hold the optical fiber in the V-groove 20. The optical fiber holding plate 30 is placed onto the optical fiber 62, thereby supporting the optical fiber 62 at three points by cooperation of the optical fiber holding plate 30 with the opposite side surfaces of the V-groove 20. To this end, a planar plate having a flat bottom surface is used for the optical fiber holding plate 30.

The upper plate 50 is adapted to be placed onto the upper flat surface 14 of the lower plate 10, and is provided with, in its bottom surface, an accommodation groove 52 for accommodating the covering 64 of the optical fiber cable 60. The accommodation groove 52 has an opening at its each end, and therefore the accommodation groove 52 can also be easily and accurately formed by a machining process utilizing a grinding stone or the like. The accommodation groove 52 is parallel to a side surface 58 and is perpendicular to an end surface 56. An adhesive injection port 54 is formed in the upper plate 50, communicating with the accommodation groove 52. The adhesive injection port 54 may be formed in the optical fiber holding plate 30.

In assembling the optical fiber assembly 500 with the optical fiber connector 100 of the first embodiment, the upper plate 50 is first placed onto the upper flat surface 14 of the lower plate 10, so that the end surface 56 of the upper plate 50 is brought into contact with side surface 13 of the stepped portion 16 of the lower plate 10. This results in the positioning of the upper plate 50 and the lower plate 10 in the longitudinal direction thereof.

An optical fiber accommodation space is defined by the upper flat surface 14 of the lower plate 10 and the accommodation groove 52 of the upper plate 50. When the distance from the side surface 58 of the upper plate 50 to the center of the accommodation groove 52 is set equal to the distance from the corresponding side surface 18 of the lower plate 10 to the center of the V-groove 20, the positioning of the accommodation groove 52 relative to the V-groove 20 is easily effected by aligning the side surface 58 of the upper plate 50 with the side surface 18 of the lower plate 19.

By inserting the optical fiber cable 60 into the accommodation groove 52 from behind, the optical fiber 62 of the optical fiber cable 60 is positioned in the V-groove 20 defined in the upper flat surface 12 of the lower plate 10. At this time, the optical fiber cable 60 once inserted in the accommodation groove 52 is maintained in this state, because the accommodation groove 52 is formed by machining with a good accuracy according to dimensions of covering 64 of the optical fiber cable 60.

Then, the optical fiber holding plate 30 is placed onto or above the upper flat surface 12 of the lower plate 10 to hold the fiber 62, and then a thermosetting resin or the like is poured into the adhesive injection groove 54 to adhesively secure the optical fiber cable 60.

Figure 3:
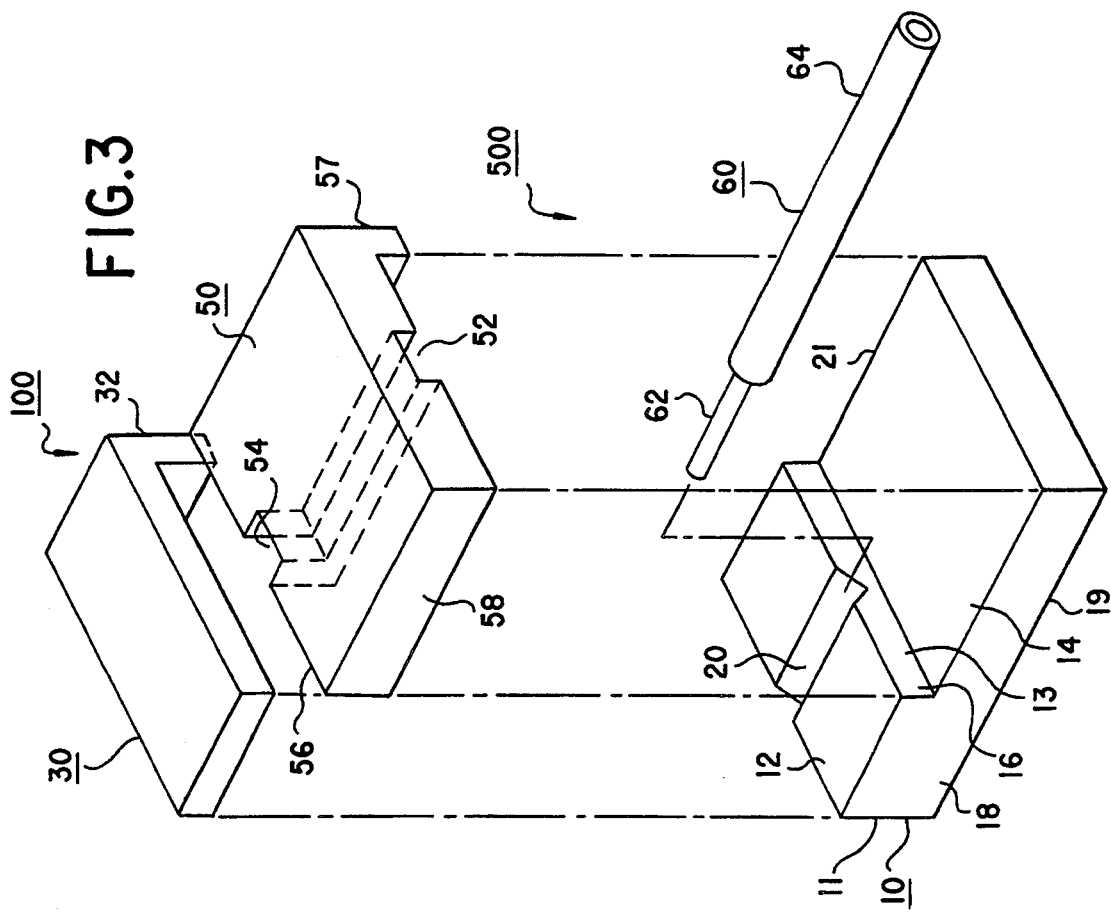
FIG. 3 is a schematic exploded perspective view for explaining an optical fiber connector according to a second embodiment of the present invention.

Referring to FIG. 3, an optical fiber connector 100 according to a second embodiment of the present invention will be explained. The optical fiber connector 100 according to the second embodiment is different from that of the first embodiment only in that positioning portions 32 and 57 for positioning of the optical fiber holding plate 30 and the upper plate 50 are provided at end portions of the optical fiber holding plate 30 and the upper plate 50, respectively. By bringing such positioning portions 32 and 57 into contact with a side surface 21 of the lower plate 10, the positioning of the optical fiber holding plate 30 and the upper plate 50 to the lower plate 10 can be achieved without using another jig. This ensures a further improved positioning accuracy in use, in cooperation with the fact that the lengthwise positioning of upper plate 50 can be performed by utilizing the stepped portion 16.

Figure 4:
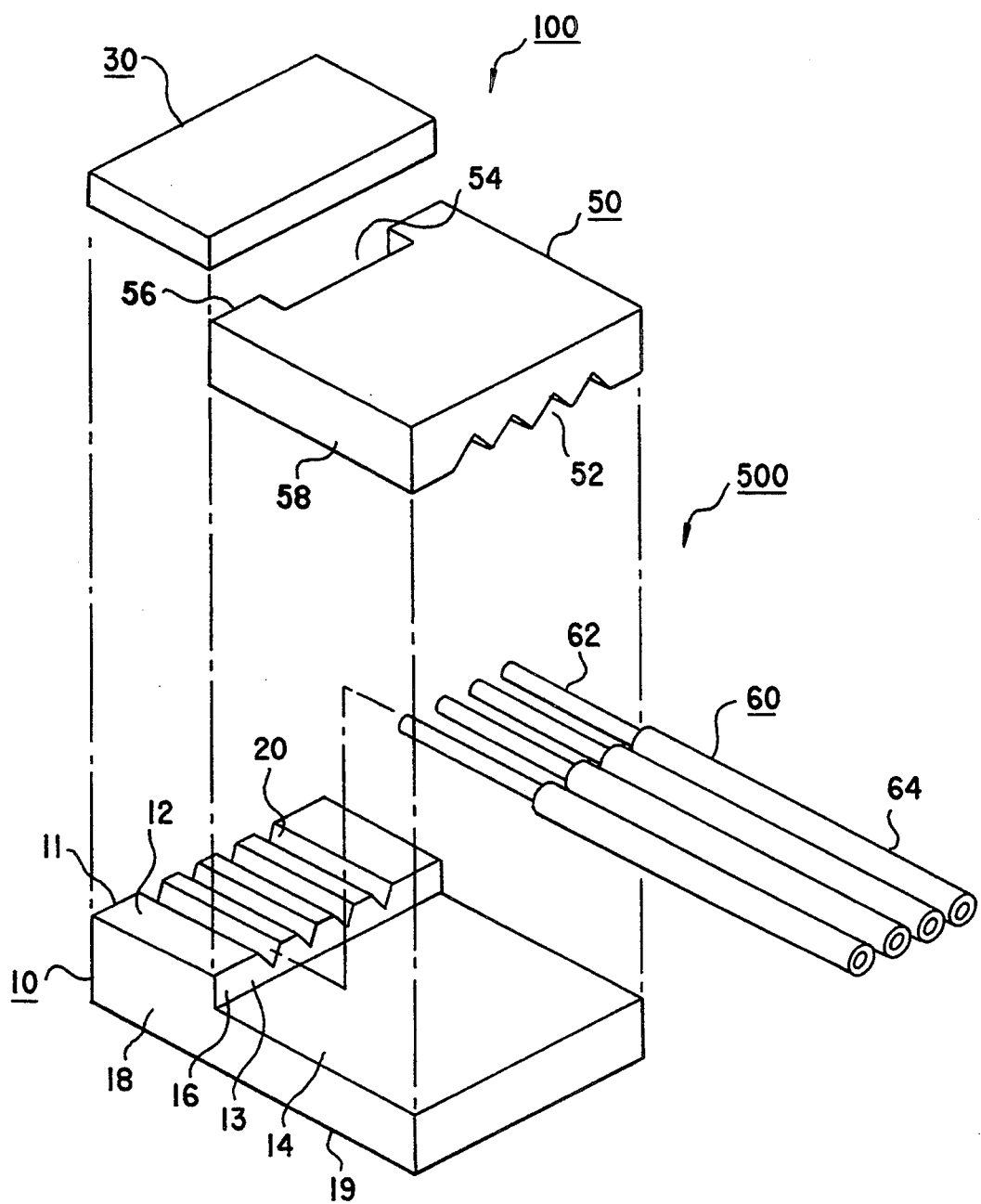
FIG. 4 is a schematic exploded perspective view for explaining an optical fiber connector according to a third embodiment of the present invention.

Referring to FIG. 4, an optical fiber connector 100 according to a third embodiment of the present invention will be explained. A plurality of V-grooves 20 is defined in the upper flat surface 12 of the lower plate 10, and a plurality of accommodation grooves 52 are also defined in the bottom surface of the upper plate 50. An optical fiber connector 100 according to the third embodiment is suitable for use in simultaneous connection of a plurality of optical fiber cables 60.

In setting a plurality of extremely fine and transparent optical fibers 62 by use of this optical fiber connector 100, an optical fiber 62 of each of the optical fiber cables 60 can be reliably set in corresponding one of the V-grooves 20. Once the optical fibers 62 have been set, the covering 64 of the optical fiber cables 60 can be fixed by the accommodation grooves 52 in the bottom surface of the upper plate 50, thus simplifying assembling.

Figure 5:
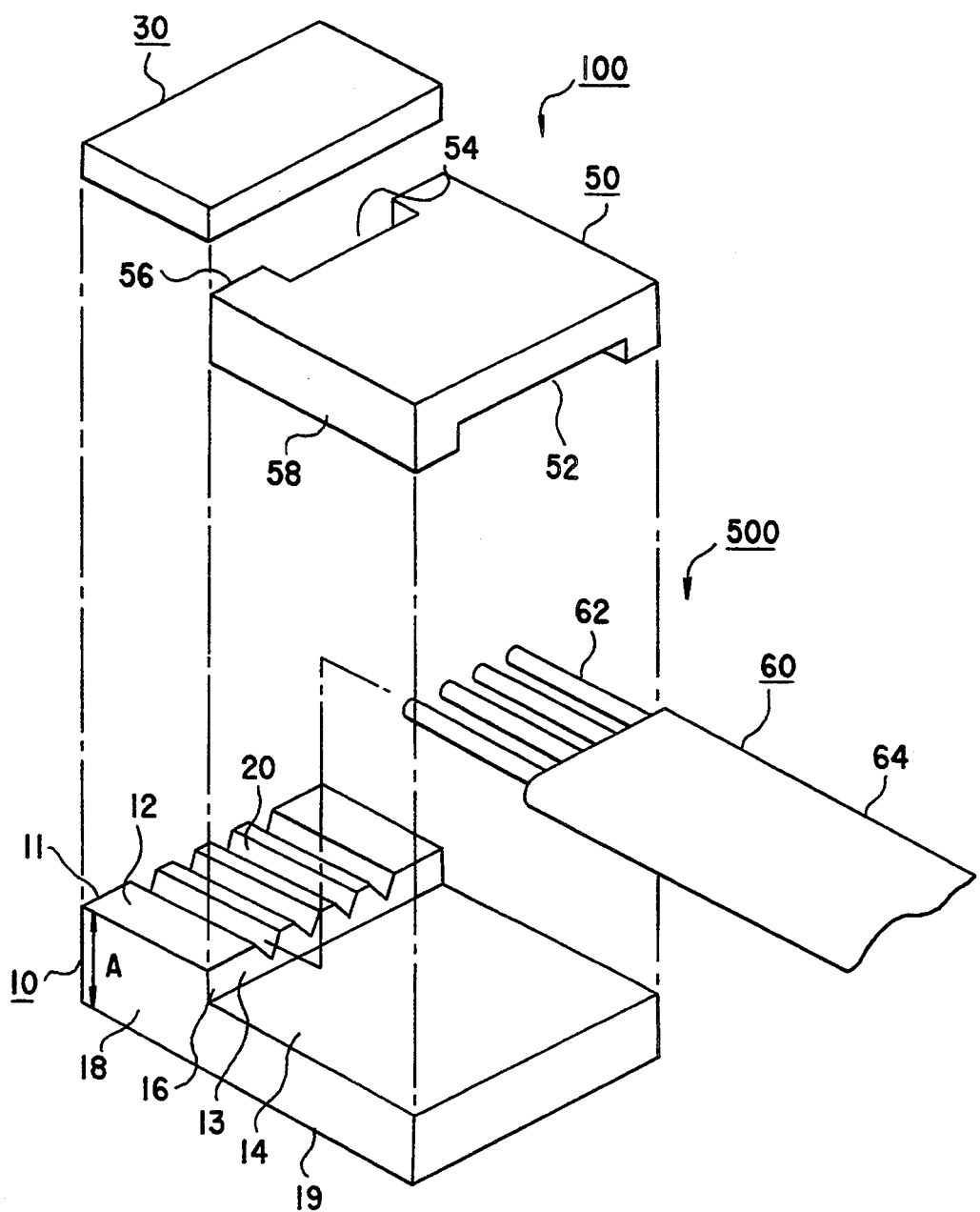
FIG. 5 is a schematic exploded perspective view for explaining an optical fiber connector according to a fourth embodiment of the present invention.

Referring to FIG. 5, an optical fiber connector 100 according to a fourth embodiment of the present invention will be explained. The optical fiber connector 100 according to the fourth embodiment is suitable for a multi-core optical fiber cable 60. This optical fiber connector 100 is different from that of the first embodiment in two respects. First, a plurality of V-grooves 20 are defined in the upper flat surface 12 of the lower plate 10 to respectively accommodate corresponding optical fibers 62 of the multi-core optical fiber cable 60. Secondly, the wider rectangular accommodation groove 52 is defined in the bottom surface of the upper plate 50 to accommodate a wide and flat tape-like optical fiber cable 64 of the multi-core optical fiber cable 60.

In the optical fiber connectors 100 according to the first to fourth embodiments, it is only required to provide, on the lower plate 10, the upper flat surfaces 12 and 14 with the stepped portion 16 interposed therebetween, and the V-groove(s) 20 in the upper flat surface 12, and to provide the accommodation grooves(s) 52 in the bottom surface of the upper plate 50.

Figure 1:
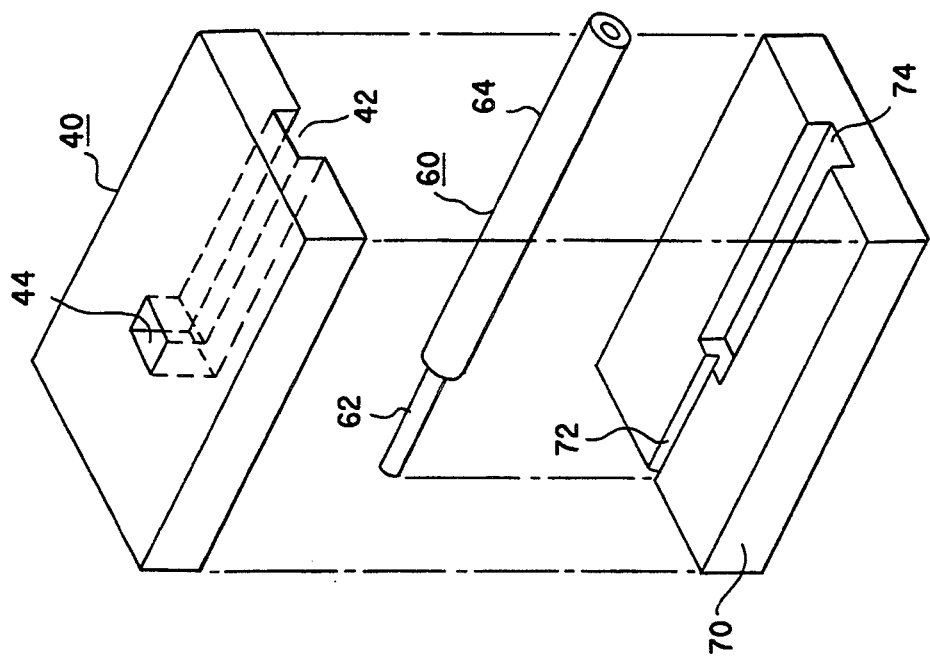
FIG. 1 is a schematic exploded perspective view for explaining a conventional optical fiber connector.

Therefore, unlike the conventional optical fiber connector as shown in FIG. 1, there is no need to form counter-bored portion 42 and 74 by ultrasonic machining. The upper flat surface 14, V-groove(s) 20 and the accommodation groove(s) 52 can be easily and accurately formed by a machining process utilizing a grinding stone or the like. Furthermore, the accommodation groove(s) 52 can also be made by pressing or the like, because accuracy in the order of sub-microns is not required as it is in the V-groove 20. In addition, the upper plate 50 itself can also be made of a resin or a metal.

Accordingly, the optical fiber connector 100 according to the first to fourth embodiments can be easily fabricated by a machining or a pressing process, resulting in a substantially reduced number of manufacturing steps and substantially reduced manufacturing cost.

Furthemore, in the optical fiber connectors 100 according to the first to fourth embodiments, the lengthwise positioning of the lower plate 10 and the upper plate 50 can be easily performed by bringing the end surface 54 of the upper plate 50 into contact with the side surface 13 of the stepped portion 16 of the lower plate 10, resulting in a reduced relative misalignment of the accommodation groove 52 relative to the V-groove(s) 20 of the lower plate 10.

Moreover, in the optical fiber connectors 100 according to the first to fourth embodiments, because dimensional and positional accuracies of the accommodation groove 52 of the upper plate 50 are high, once the positioning of the upper plate 50 has been completed, by inserting the optical fiber cable 60 into the accommodation groove 52 from the rearward, the optical fiber 62 of the optical fiber cable 60 can be easily located in the V-groove 20 and the optical fiber cable 60 once inserted is fixed by the covering 64 and the accommodation groove 52. This provides the advantage of not having to fix the optical fiber cable 60 externally, and assembling can be easily performed.

Referring to FIGS. 6–11, a method of manufacturing an optical fiber connector 100 and an optical fiber assembly 500 according to a fifth embodiment of the present invention will be explained. Referring to FIGS. 12–15, a method of manufacturing an optical fiber connector 100 and an optical fiber assembly 500 according to a sixth embodiment of the present invention will also be explained.

Figure 6:
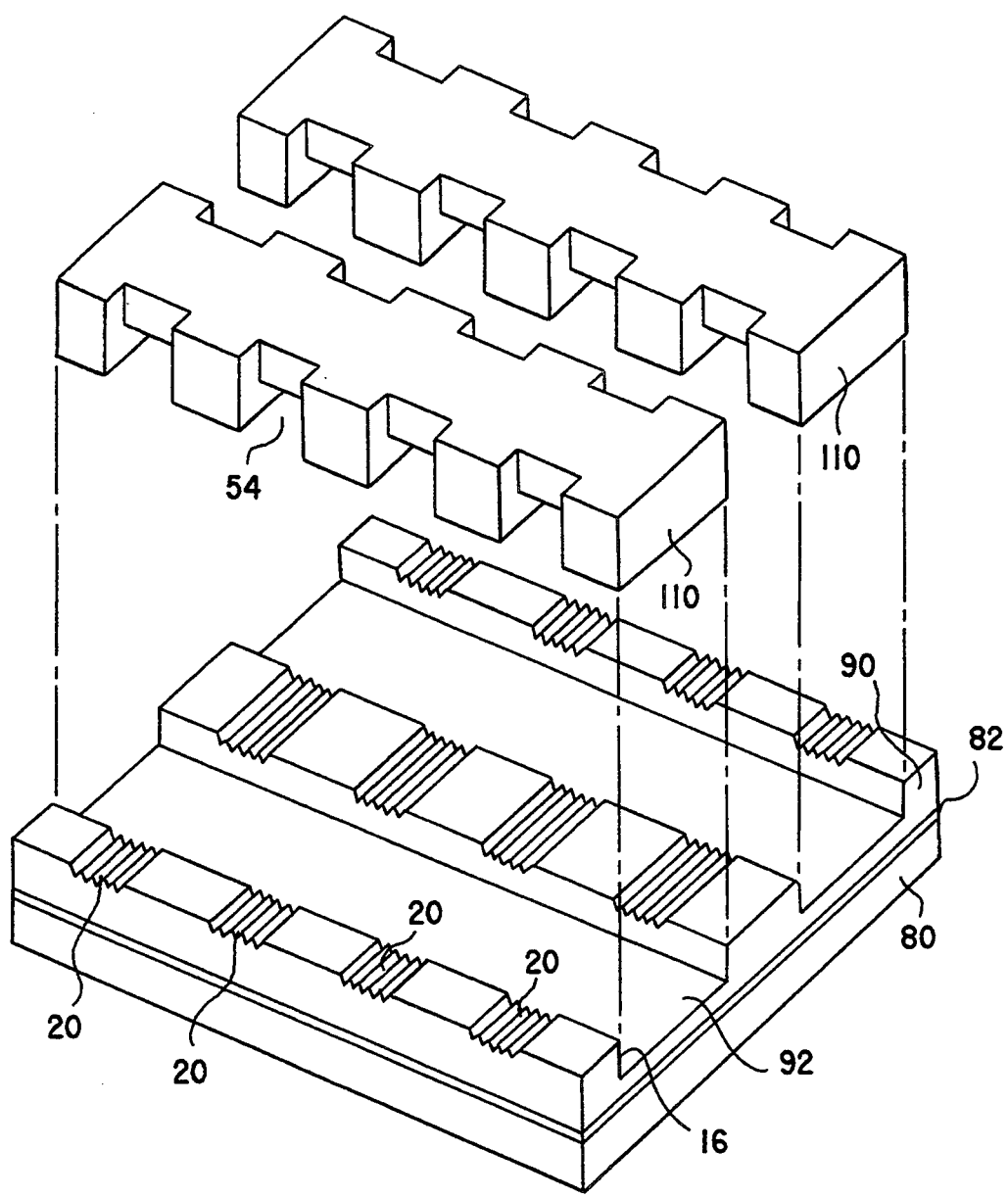

Referring to FIG. 6, first, a ceramics wafer 90 is fixed on an upper surface of a glass plate 80 by means of a wax 82. Next, a plurality of groups of V-grooves 20 are formed in the upper surface of the wafer 90. In this embodiment, four groups of five V-grooves 20 corresponding to five cores optical fiber cables, are defined. The machining of the V-grooves 20 can be performed with good accuracy and efficiency by use of a grinding stone. Then, rectangular grooves 92 are formed with stepped portions 16 in a direction perpendicular to the V-grooves 20. The number of the rectangular grooves 92 is two, but optionally, can be increased or decreased. As a result, the wafer 90 having the plurality of groups of V-grooves 20 and the rectangular grooves 92 as shown in FIG. 6 is fabricated.

It should be noted that such a wafer fabricating process need not be used in the present embodiment. For example, the plurality of groups of V-grooves 20 may be formed in parallel in the wafer 90 having the rectangular grooves 92 preformed therein.

Figure 8:
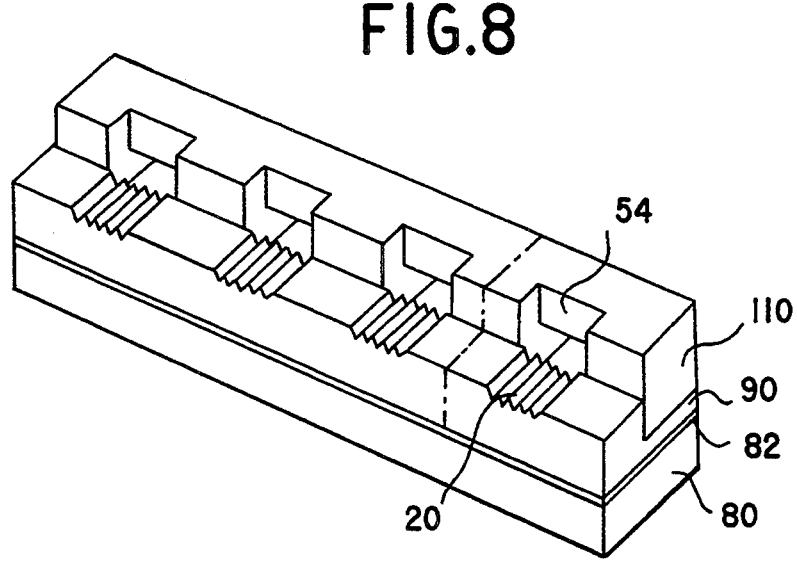

In addition to preparing the wafer 90, an oblong integrated upper plate 110 as shown in FIG. 6 is prepared separately. The integrated upper plate 110 is profiled to fit in the rectangular groove 92. The integrated upper plate 110 is monolithically composed of a plurality of the upper plates 50 shown in FIG. 9, and in the illustrated embodiment, is composed of 2×4 upper plates 50. Alternatively, the integrated upper plate 110 may be composed of upper plates 50 integrated in a single row as shown in FIG. 8.

Figure 9:
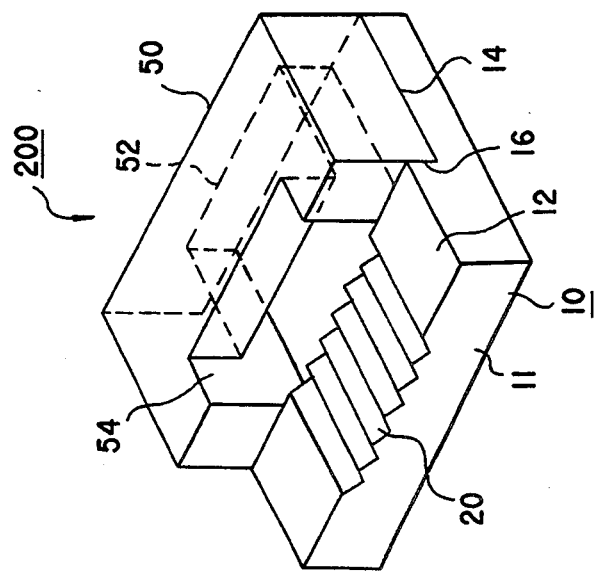
FIGS. 6, 7, 8, 9, 10 and 11 are schematic perspective views for explaining a method of manufacturing an optical fiber connector and an optical fiber assembly according to a fifth embodiment of the present invention.

Referring to FIG. 9, the upper plate 50 is of a portal shape or a gate type and has a accommodation groove 52, for accommodating the covering 64 of the optical fiber cable 60, defined in a bottom surface thereof in correspondence to the V-grooves 20. The accommodation groove has an opening at each end thereof. A rectangular adhesive injection groove 54 communicating with the accommodation groove 52 is also defined in the upper plate 50.

Figure 7:
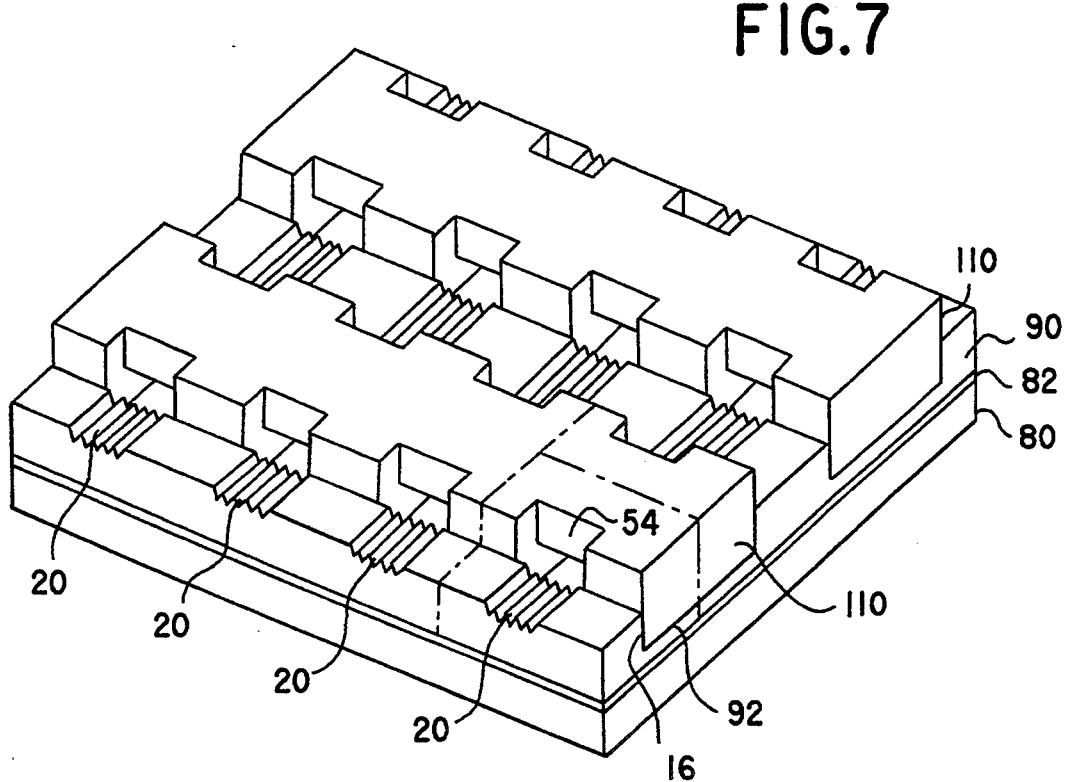

Referring to FIG. 7, the integrated upper plates 110 are accurately positioned, bonded and fixed to the rectangular grooves 92 of the wafer 90 by use of an epoxy resin adhesive.

Thereafter, the integrated upper plates 110 and the wafer 90 are cut at least in parallel to the V-grooves 20, as shown by one-dot dashed lines in FIG. 7, thereby providing a plurality of chipped optical fiber connector frames 200 shown in FIG. 9 by removal from the glass plate 80. In the illustrated embodiment, sixteen optical fiber connector frames 200 are produced simultaneously from one wafer 90.

Alternatively, the adhesive injection groove 54 in the integrated upper plate 110 may be semicircular, as shown in FIGS. 12 to 15. When the adhesive injection groove 54 is of such a round shape, there is obtained the advantage that a shrinkage stress produced during curing of the adhesive can be relaxed to prevent cracks from being produced.

Figure 11:
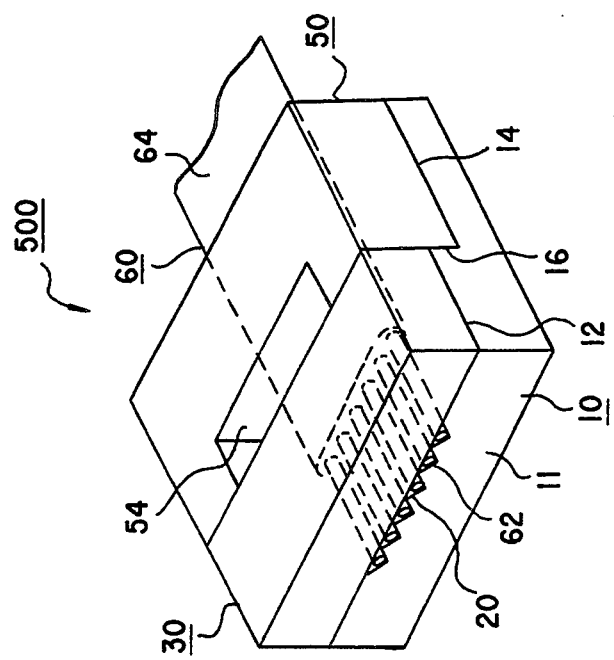
Figure 10:
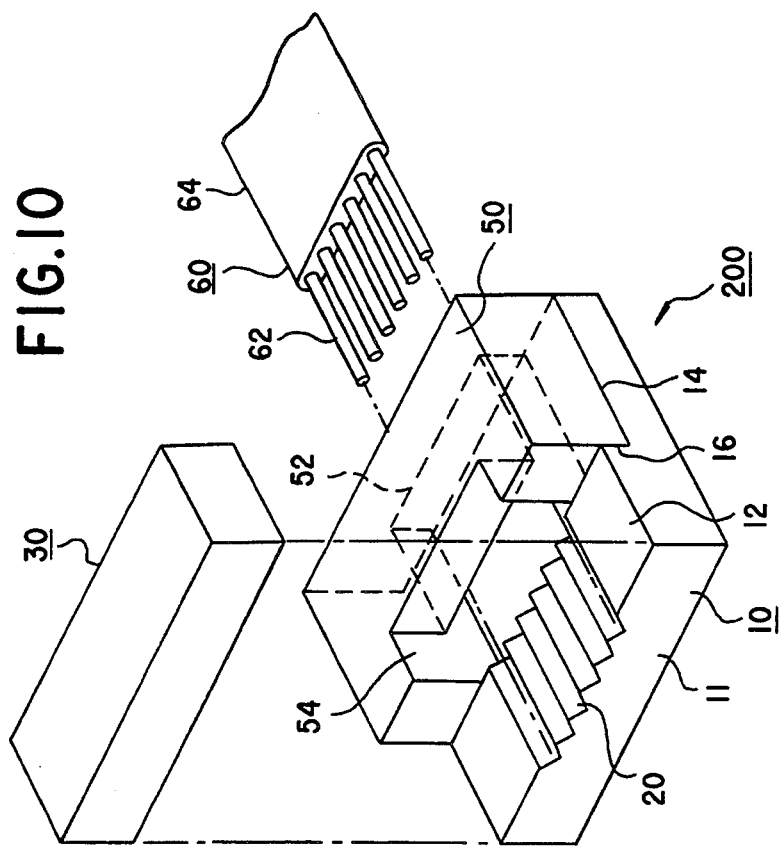
Figure 12:
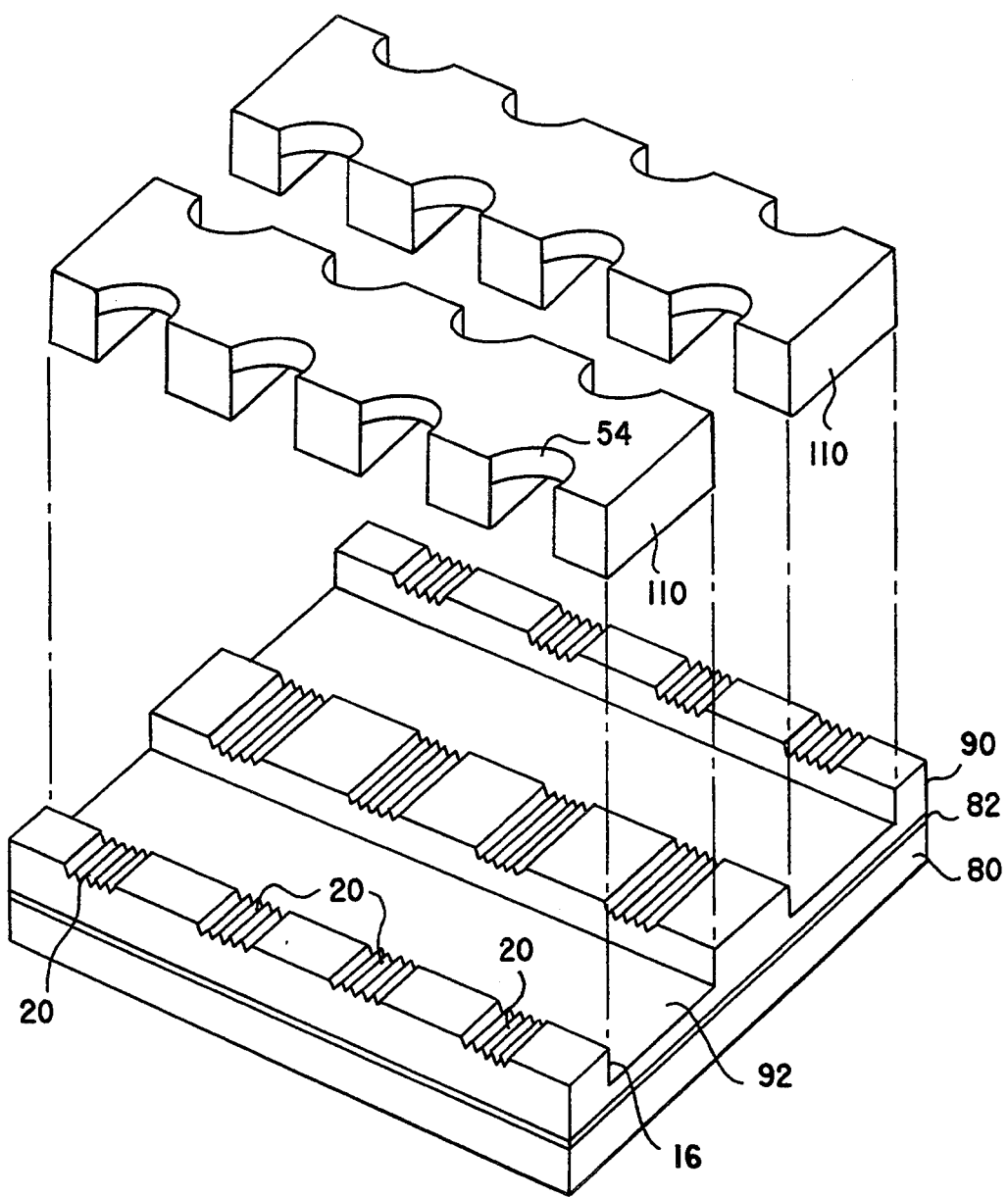
FIGS. 12, 13, 14 and 15 are schematic perspective views for explaining a method of manufacturing an optical fiber connector and an optical fiber assembly according to a sixth embodiment of the present invention.
Figure 13:
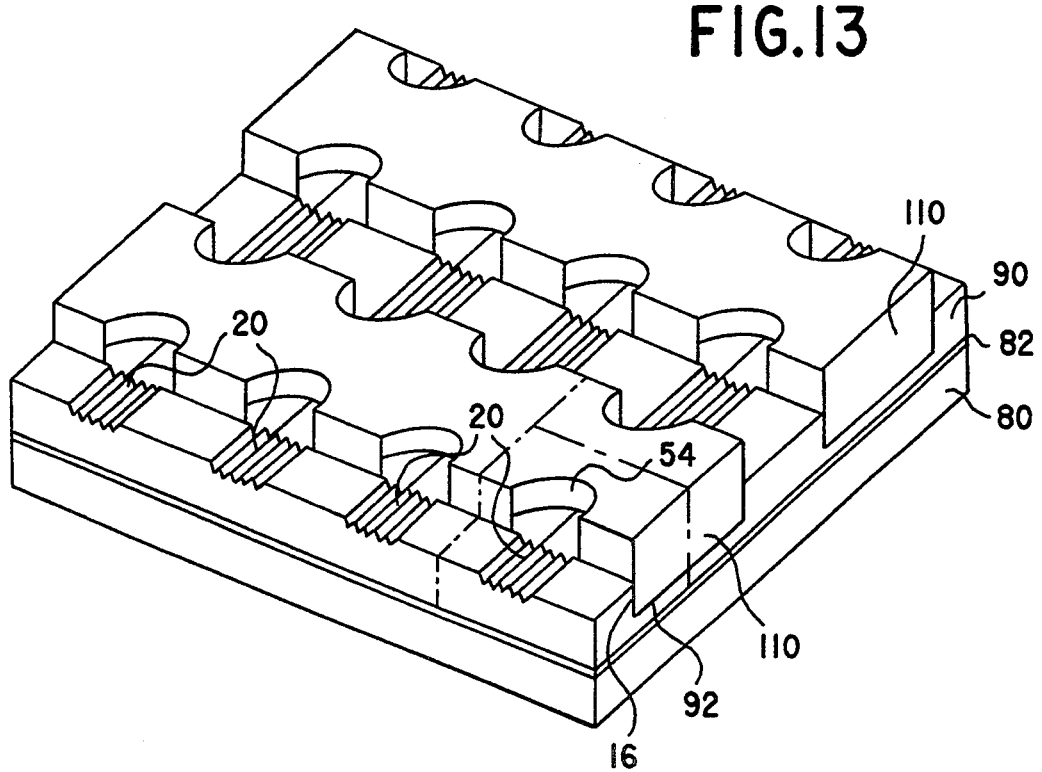
Figure 14:
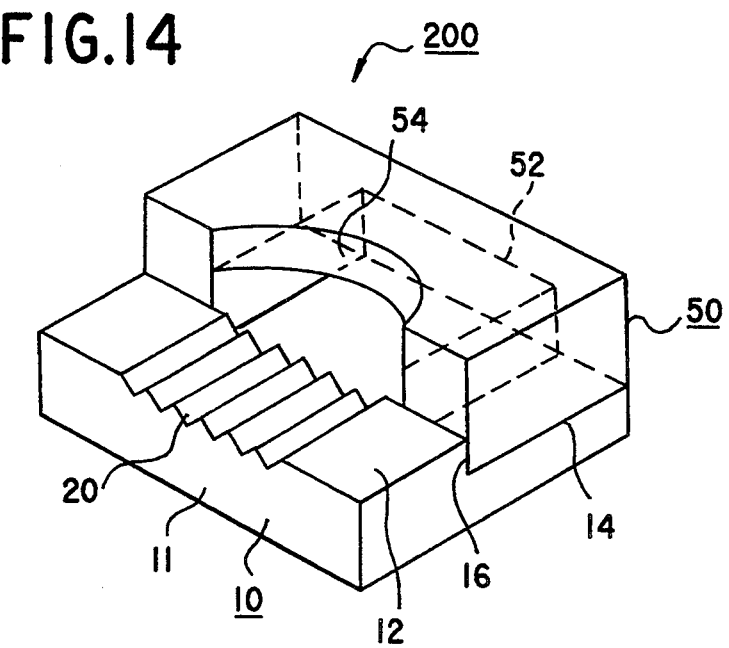
Figure 15:
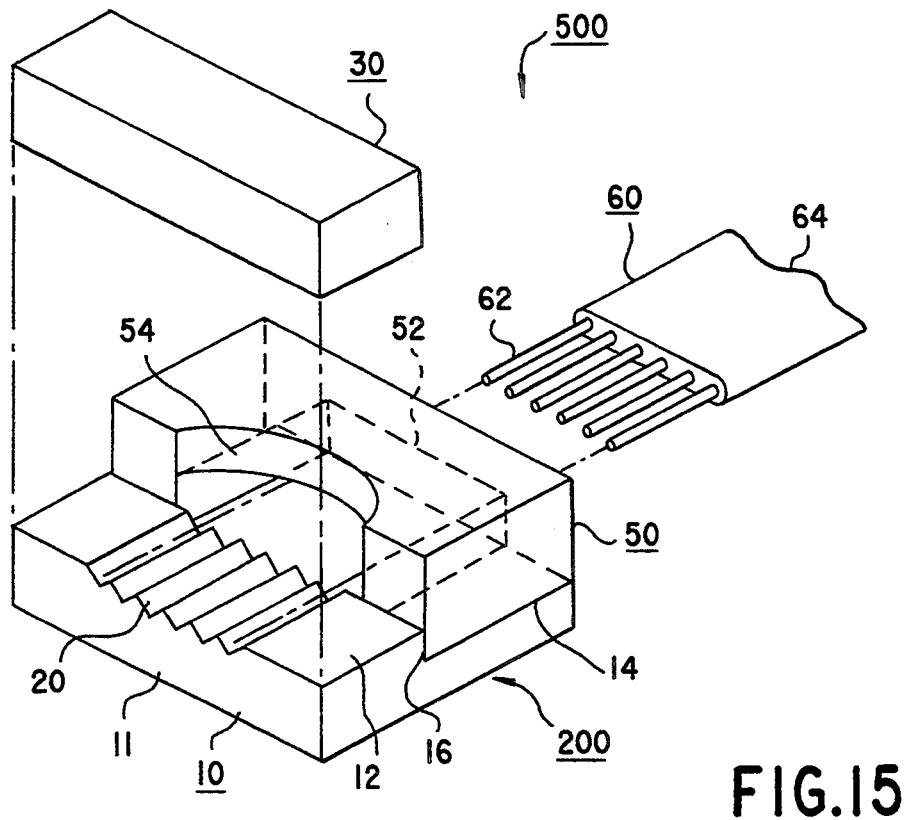

Referring to FIGS. 9 and 14, the optical fiber connector frame 200 produced in this manner is of a configuration such that the upper plate 50 resulting from the cutting of the upper integrated plate 110 is fixed to the upper flat surface 14 of the lower plate 10 resulting from the cutting of the wafer 90. Therefore, as shown in FIGS. 10, 11 and 15, when a multi-core (six cores in the illustrated embodiment) optical fiber cable 60 are inserted through the accommodation cavity defined in a space between the upper flat surface 14 of the lower plate 10 and the accommodation groove 52 of the upper plate 50, optical fibers 62 at the leading portion of the optical fiber cable 60 are put into the V-grooves 20 in correctly positioned states. After bonding and fixing by the optical fiber holding plate 30, and end surface 11 is polished to become an optical grade, thereby ensuring that the optical fibers 62 of an optical fiber assembly 500 can be connected to another optical instrument.

With the method of manufacturing an optical fiber connector 100 and an optical fiber assembly 500 according to the fifth and sixth embodiments of the present invention, advantages can be obtained, including:

(1) A large number of optical fiber connector frame 200 can be produced by cutting the integrated upper plate 110 and the wafer 90 at one time, resulting in substantially reducing the number of machining steps and the time.

(2) The operation of fixing the individual upper plates 50 which normally requires much labor can be eliminated, thereby substantially shortening the assembling time.

(3) The optical fiber connector frame 200 is produced from the simultaneous cutting of the integrated upper plate 110 and the wafer 90 after securing the integrated upper plate 110 to the wafer 90, and therefore it is possible to completely eliminate the risk that the upper plate 50 is displaced relative to the lower plate 10.

(4) It is also possible to substantially eliminate the leakage of the adhesive, and to prevent defects of fragments resulting from the removal of the leaked adhesive.

(5) The cut face serves as the reference face for the polishing, and therefore, the reference face for the polishing can be ensured sufficiently, thereby reducing the error in the polishing angle due to an inclination at a polishing angle.

Referring to FIGS. 16-20, a method of manufacturing an optical fiber assembly 500 according to a seventh embodiment of the present invention will be explained.

Figure 16:
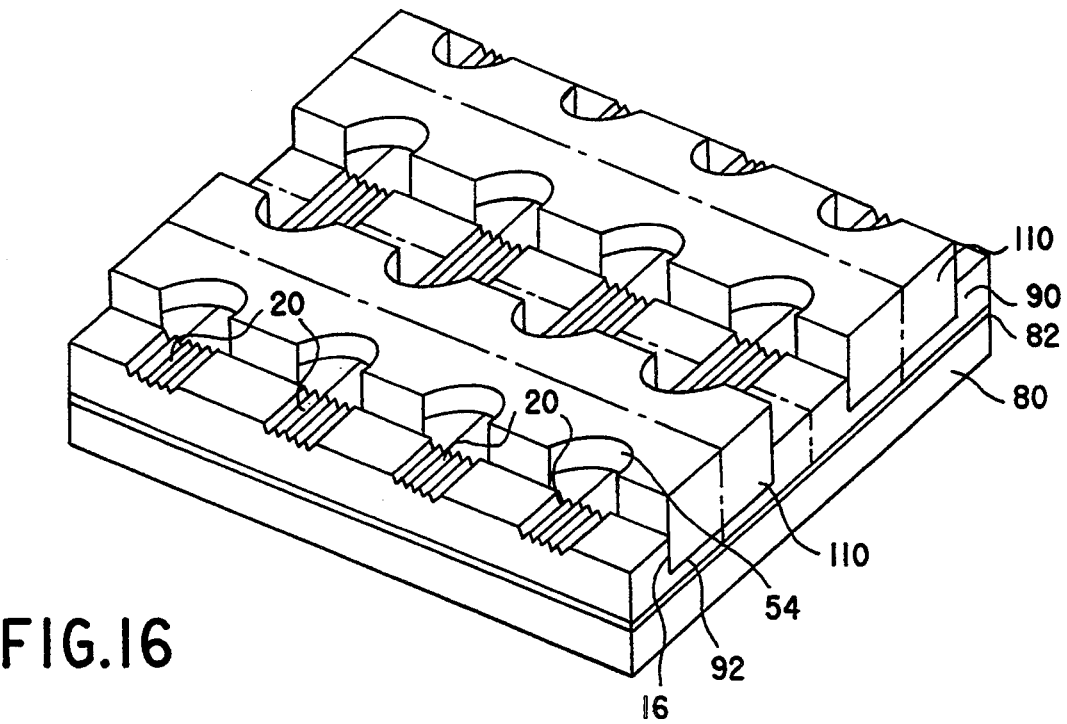
FIGS. 16, 17, 18, 19 and 20 are schematic perspective views for explaining a method of manufacturing an optical fiber assembly according to a seventh embodiment of the present invention.

Referring to FIG. 16, first, a wafer 90 of ceramics is fixed on an upper surface of a glass plate 80 by means of a wax 82. Next, a plurality of groups of V-grooves 20 are formed in the upper surface of the wafer 90. In this embodiment, four groups of five V-grooves 20 corresponding to a five cores optical fiber cable, are defined. The machining of the V-grooves 20 can be performed with good accuracy and efficiency by use of a grinding stone. Then, rectangular grooves 92 are formed with stepped portions 16 in a direction perpendicular to the V-grooves 20. The number of the rectangular grooves 92 is two, but optionally, can be increased or decreased. As a result, the wafer 90 having the plurality of groups of V-grooves 20 and the rectangular grooves 92 as shown in FIG. 16 is fabricated.

It should be noted that such a wafer fabricating process need not be used in the present embodiment. For example, the plurality of groups of V-grooves 20 may be formed in parallel in the wafer 90 having the rectangular grooves 92 performed therein.

In addition to preparing the wafer 90, an oblong integrated upper plate 110 as shown in FIG. 16 is prepared separately. The integrated upper plate 110 is profiled to fit in the rectangular groove 92. The integrated upper plate 110 is monolithically composed of a plurality of the upper plates 50 shown in FIG. 20, and in the illustrated embodiment, is composed of 2×4 upper plates 50.

Referring to FIGS. 17-20, the upper plate 50 is of a portal shape or a gate type and has an accommodation groove 52, for accommodating the covering 64 of the optical fiber cable 60, defined in a bottom surface thereof in correspondence to the V-grooves 20. The accommodation groove 52 has an opening at each end thereof. A semicircular adhesive injection grooves 54 communicating with the accommodation groove 52 is also defined in the upper plate 50. When the adhesive injection groove 54 is of such a round shape, there is obtained an advantage that the shrinkage stress produced during curing of the adhesive can be relaxed to prevent cracks from being produced.

Now, referring to FIG. 16, the integrated upper plates 110 are accurately positioned, bonded and fixed to the rectangular grooves 92 of the wafer 90 by use of an epoxy resin adhesive.

Figure 17:
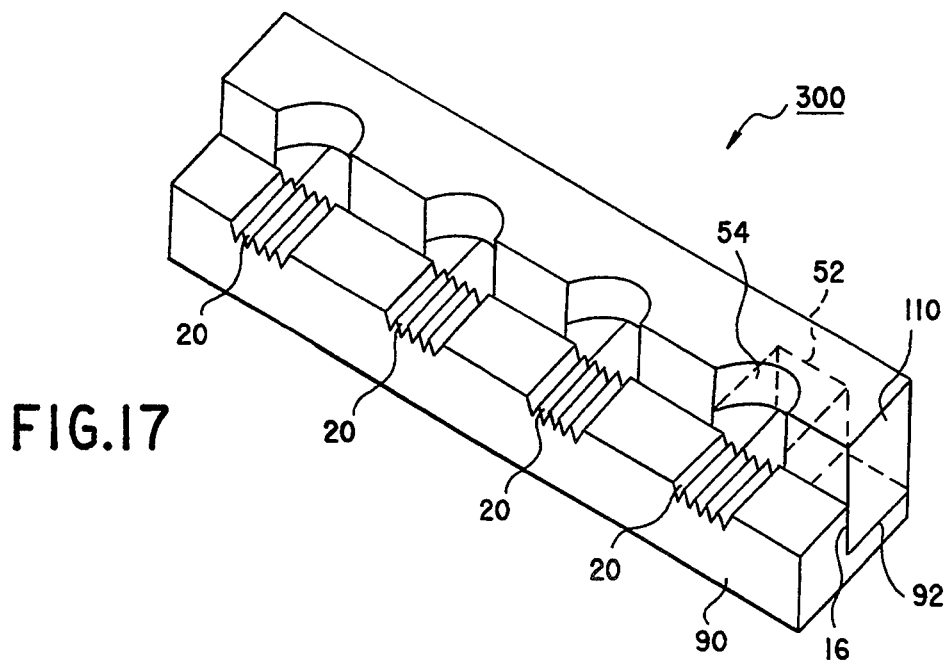

In this embodiment, the integrated upper plates 110 and the wafer 90 are then simultaneously cut in a direction parallel to the V-grooves 20, as shown by the one-dot dashed lines in FIG. 16. As a result, as shown in FIG. 17, multi-frame bars 300 as intermediate products are obtained.

Figure 18:
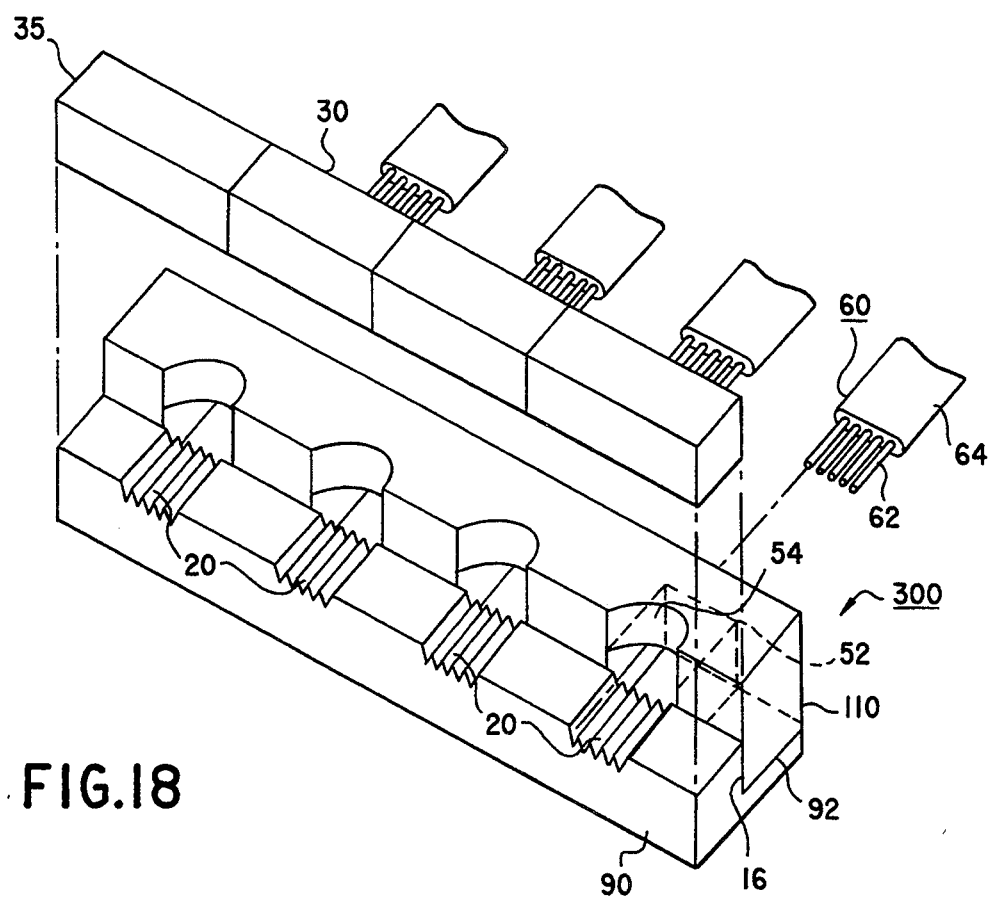

Referring to FIG. 18, next, when a multi-core (five cores in the illustrated embodiment) optical fiber cables 60 are inserted through the accommodation cavity defined in the space between rectangular groove 92 and the accommodation groove 52, optical fibers 62 at the leading portion of the optical fiber cable 60 are put into the V-grooves 20 in correctly positioned states.

After the optical fibers 62 are accommodated in the V-grooves 20 in this manner, the optical fibers 62 are bonded and fixed to the V-grooves 20 by an optical fiber holding plate 35. In the illustrated embodiment, four separate optical fiber holding plates 30 are used as the optical fiber holding plate 35. By using the independent optical fiber holding plates 30 in this way, it is possible to correctly fix the optical fibers 62, irrespective of variations of the dimension of V-grooves 20 and of the diameter of the optical fibers 62.

Figure 19:
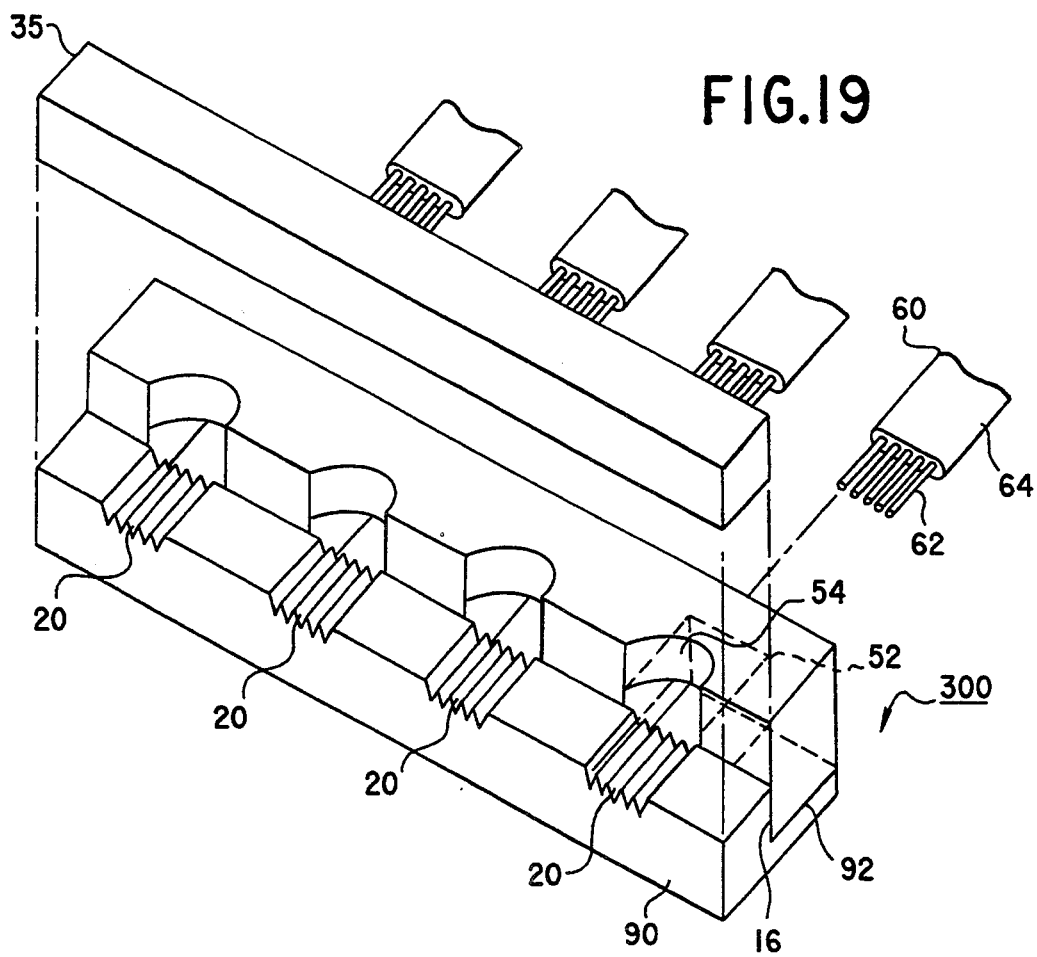

Depending upon applications of the optical fiber assembly, a deviation as small as 2 to 10 μm may be acceptable. In such a case, a monolithic optical fiber holding plate 35 wherein four individual optical fiber holding plates are monolithically integrated, may be used, as shown in FIG. 19.

Figure 20:
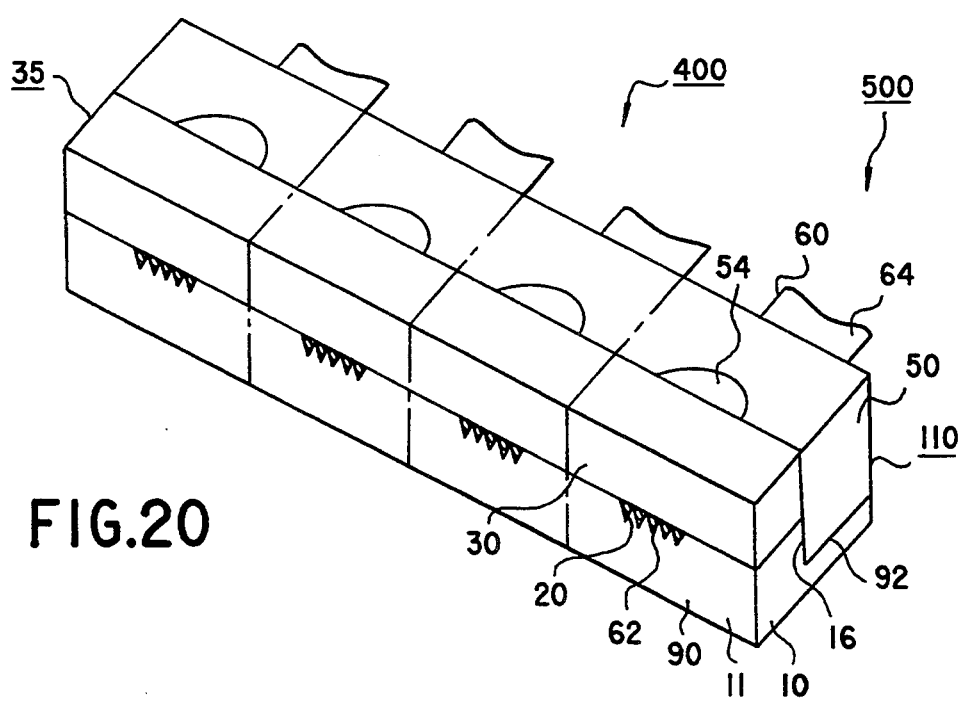

A product 400 of a shape as shown in FIG. 20 is obtained through the above-described steps. Then, end surface 11 of the product 400 is polished. In the embodiment, the polishing of the end surfaces 11 can be achieved simultaneously for four optical fiber assemblies, resulting in a substantially shortened polishing time.

After completion of the polishing, the integrated upper plate 110 and the wafer 90 are simultaneously cut as shown in a dashed line in FIG. 20 into four chips. As a result, four optical fiber assemblies 500 are simultaneously provided wherein the optical fibers 62 of the optical fiber cables 60 are accommodated and fixed in the V-grooves 20 of the lower plate 10 by the optical fiber holding plate 30 and the covering 64 of the optical fiber cable 60 are accommodated and held by the accommodation groove 52 of the upper plate 50 resulting from the cutting of the integrated upper plate 110. The optical fiber assembly 500 can be used for connection of another optical instrument to the optical fibers 62.

With the method of manufacturing an optical fiber assembly 500 according to the seventh embodiment of the present invention, advantages can be obtained, including:

(1) A large number of optical fiber assembly 500 can be produced by cutting the integrated upper plate 110 and the wafer 90 at one time, resulting in substantially reducing the number of machining steps and the time.

(2) The operation of fixing the individual upper plates 50 which has required much labor, can be eliminated, thereby substantially shortening the assembling time.

(3) Since the integrated upper plate 110 and the optical fiber holding plate 35 are bonded to the wafer 90 to form the intermediate product 400, followed by cutting the intermediate product 400 into the individual optical fiber assemblies 500, a misalignment can be avoided among the following three components: the lower plate 10 having V-grooves 20 resulting from the cutting of the wafer 10, the upper plate 50 resulting from the cutting of the integrated upper plate 110, and the optical fiber holding plate 30.

(4) The squeezing-out of the adhesive can be completely avoided, because the cutting is carried out after completion of the assembling. This ensures that there are no fragments and scratches generated due to the removal of the squeezed-out adhesive, thereby providing an optical fiber assembly product which does not deteriorate in strength and appearance.

(5) Several optical fiber assembly products can be polished at one time, to substantially reduce the polishing operation and cost.

(6) Several sets of the optical fiber assemblies can be assembled at one time, thereby improving assembling. The adjustment of the optical fiber holding plate 30 can be easily performed, because the lateral deviation up to the cutting width (for example, 1 mm) can be absorbed by cutting.

(7) When the monolithically integrated optical fiber holding plate 35 is used, it is possible to further substantially reduce the number of the steps.

Figure 21:
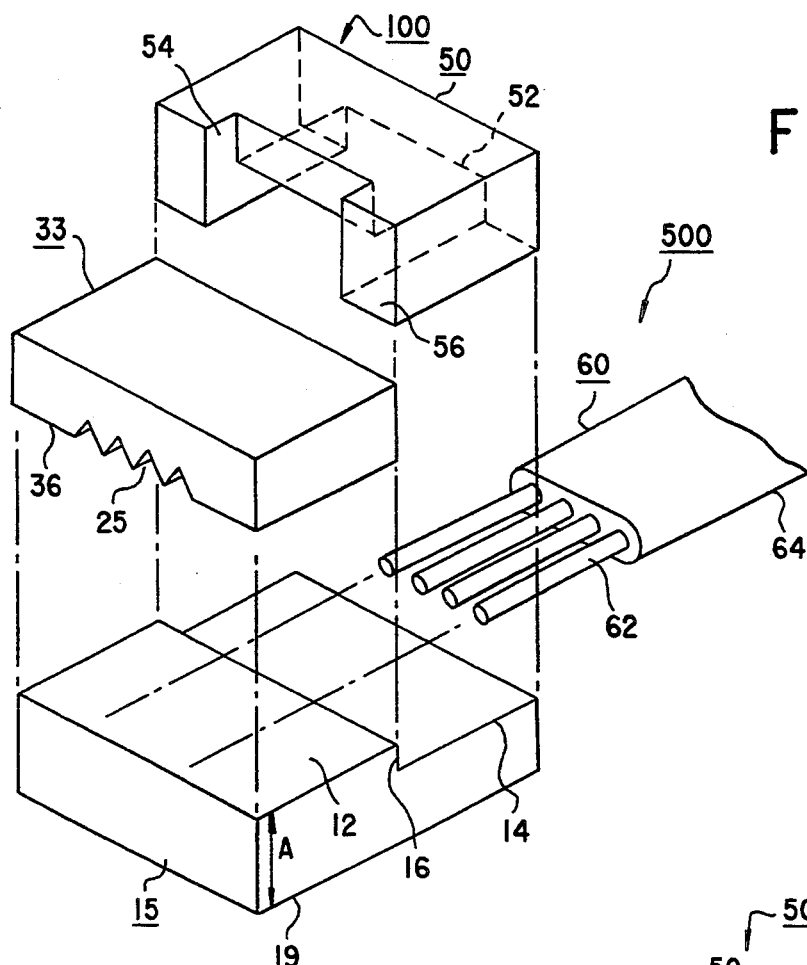
FIG. 21 is a schematic exploded perspective view for explaining an optical fiber assembly according to an eighth embodiment of the present invention.
Figure 22:
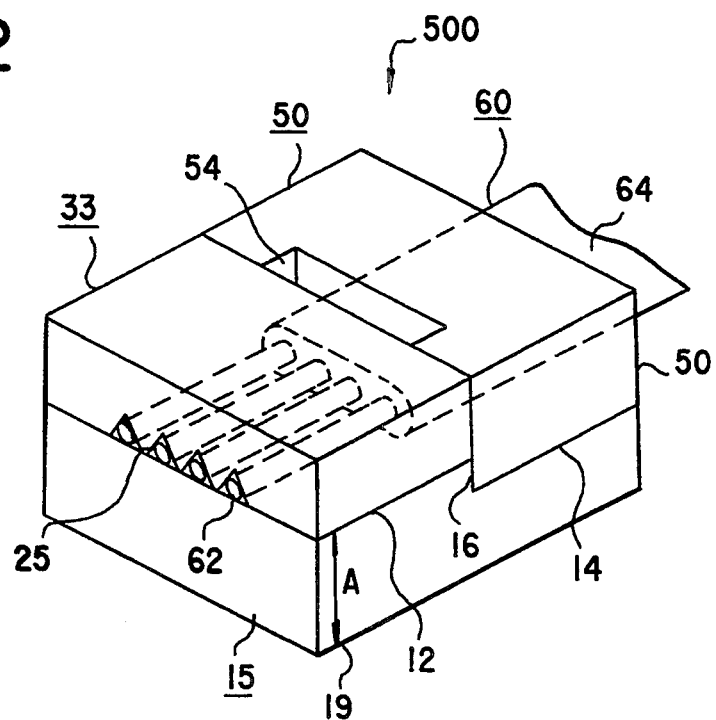
FIGS. 22 and 23 are schematic exploded perspective views for explaining an optical fiber assembly according to an eighth embodiment of the present invention.
Figure 23:
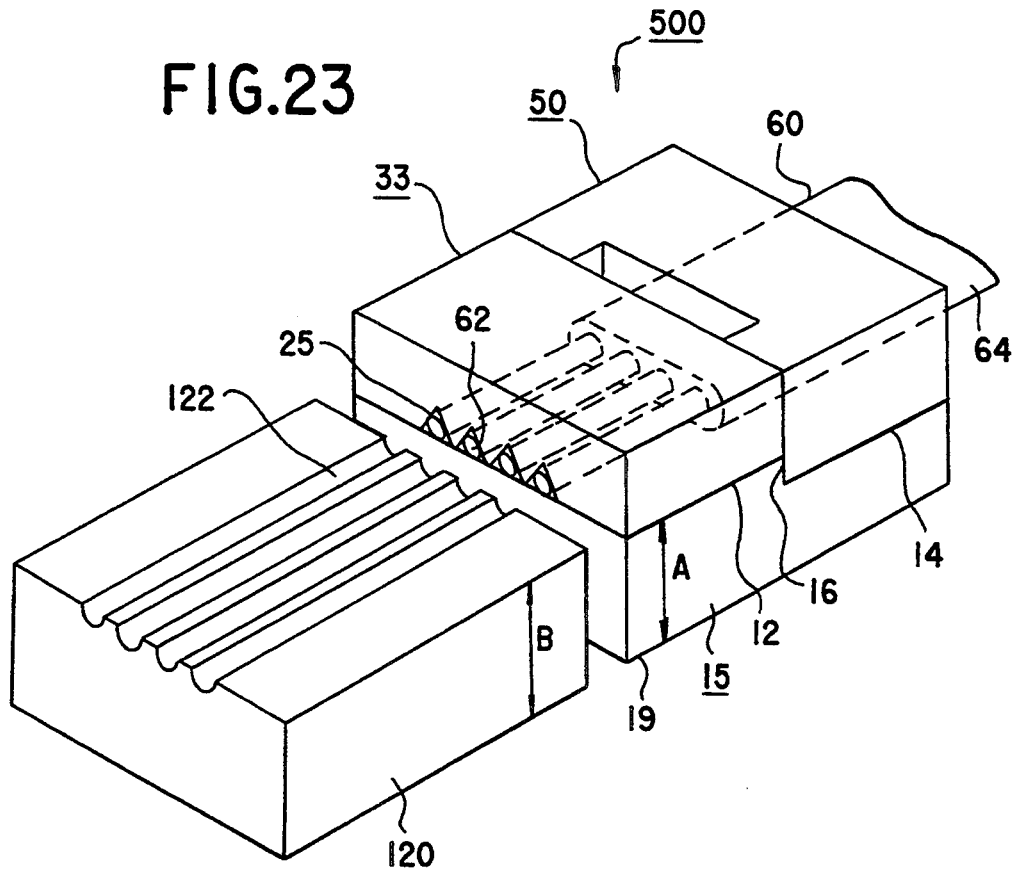

Referring to FIGS. 21–23, an optical fiber connector 100 according to an eighth embodiment of the present invention will be explained.

Referring to FIG. 21, an optical fiber connector 100 includes a lower plate 15, an optical fiber accommodation plate 33 and an upper plate 50.

The lower plate 15 is provided with an upper flat surface 12 and an upper flat surface 14 with a stepped portion 16 interposed therebetween, and a bottom flat surface 19. The upper flat surface 12, the upper flat surface 14 and the bottom flat surface 19 are formed in a spaced-apart parallel relationship. The upper flat surface 14 is lower than the upper flat surface 12. The height of the stepped portion 16 (that is, the height difference between the upper flat surface 12 and the upper flat surface 14), is set to about one half of the thickness of the covering 64 of the optical fiber cable 60, so that the optical fiber 62 is located in the V-groove 25, when the covering 64 of the optical fiber cable 60 is placed on the upper flat surface 14. In the present embodiment, no V-grooves are formed in the upper flat surface 12.

The optical fiber accommodation plate 35 is provided, in its bottom surface 36, with V-grooves 25 for accommodating optical respective fibers 62 of the optical fiber cable 60. In this embodiment, the number of the V-grooves 25 is four in correspondence with the 4-core optical fiber cable 60, but the number of the V-grooves 25 may correspond to the number of cores in the optical fiber cable 60. The V-groove 25 has an opening at each end thereof. The optical fiber accommodation plate 33 is to be put on or above and secured to the upper flat surface 12 of the lower plate 15 to firmly hold the optical fibers 62 in the V-grooves 25.

The upper plate 50 is adapted to be placed onto the upper flat surface 14 of the lower plate 10, and is provided with, in its bottom surface, an accommodation groove 52 for accommodating the covering 64 of the optical fiber cable 60. The accommodation groove 52 has an opening at its each end. In the state shown in FIG. 21, the cross-section of the accommodation groove 52 has an inverted-U shape or is a gate-type. An adhesive injection port 54 is formed in the upper plate 50, communicating with the accommodation groove 52.

By accommodating optical fibers 62 of the optical fiber cable 60 in the V-grooves 25 and by accommodating the covering 64 of the optical fiber cable 60 in the accommodation groove 52, the optical fiber cable 60 is secured on the upper flat surfaces 12 and 14 of the lower plate 15.

Like the optical fiber connectors 100 according to the first to seventh embodiments, the optical fiber connector according to the present embodiment is used to fix the optical fibers 62 of the optical fiber cable 60 and to connect the optical fibers 60 to another optical element such as, for example, a waveguide plate 120 as shown in FIG. 23.

In the optical fiber connector 100 according to the present embodiment, however, it is unnecessary to machine V-grooves 20 in the upper flat surface 12 of the lower plate 15. Therefore, the accuracy of a dimension indicated by A in FIGS. 21-23 between the bottom flat surface 20 and the upper flat surface 22 of the lower plate 15 can be about $\pm 2$ $\mu$m, which is equal to the accuracy of thickness of a wafer itself, which serves as the original plate for the lower plate 10. Moreover, the bottom flat surface 19 of the lower plate 10 can serve as a reference face used in connecting the optical fiber connector 100 to another optical element, because the bottom flat surface 19 has a wider area. Consequently, when the optical fiber connector 100 according to the present embodiment is used, in connecting the optical fibers 62 to another optical element, the adjustment in a height-wise direction becomes substantially unnecessary, and the alignment can be achieved only by a lateral adjustment, resulting in a substantially improved operating efficiency.

Furthermore, in the optical fiber connector 100 according to the present embodiment, because the V-grooves 25 extend the length of the optical fiber accommodation plate 33, all the V-grooves 25 formed in the bottom surface 36 of the optical fiber accommodation plate 33, are effectively put to practical use for a optical fiber connector product, and therefore, there is not wasteful movement of a grinding stone over a region not used for provision of the grooves 25, leading to an advantage that the groove-machining time can be shortened.

Referring to FIGS. 24-30, an optical fiber connector and a method of fabricating an optical fiber assembly according to ninth to twelfth embodiments of the present invention will be explained.

The ninth to twelfth embodiments relate to an optical fiber connector suitable for optically coupling optical fibers with a mating member, and a method of coupling optical fibers with the mating member.

When an optical fiber is optically coupled with a mating member such as a waveguide, the core center of the optical fiber must be aligned with the optical center of the mating member. To this end, the optical fiber is first fixed between a V-groove formed in the lower plate and an optical fiber holding plate to fabricate an optical fiber assembly. Then, the optical fiber assembly and the mating member are aligned with each other. To correctly perform such alignment, the following methods have been developed and studied.

A first method is to introduce light into an optical fiber of an optical fiber assembly in a condition in which the optical fiber assembly and the mating member have been respectively placed on different stages, and to align and couple the optical fibers of the optical fiber assembly with the mating member, while finely moving the stages, so that the power of output light from the mating member becomes maximum. This method is the most general and realistic method utilized at present. In this method, however, a complicated system is required, and moreover, the complexity and cost to reach the completion of the coupling are large.

A second method is to form a guide groove in an optical fiber assembly and a corresponding guide groove in a mating member and to insert a guide pin into these guide grooves to achieve the alignment. However, this method is accompanied by the problem that much labor is required for the formation of the guide grooves. Another problem is that, especially when the mating member is a waveguide plate, the guide groove must be formed without grinding of the upper surface of the mating member and hence, it is very difficult to provide accuracy.

A third method is to conduct alignment of an optical fiber of an optical fiber assembly with a mating member, by using outer surfaces of the optical fiber assembly and the mating member as reference surfaces. This method is very attractive in that the alignment of the optical fiber assembly with the mating member can be possibly achieved automatically only by inserting both of them into a certain package. Industrial execution of the third method has not yet been achieved, and the development continues.

The ninth to twelfth embodiments provide an optical fiber connector and a method of fabricating an optical fiber assembly wherein the optical fiber of the optical fiber assembly can be correctly aligned with a mating member on the basis of an outer surface of the optical fiber connector without dependence on the thickness accuracy of the V-grooved plate and the optical fiber holding plate.

Figure 24:
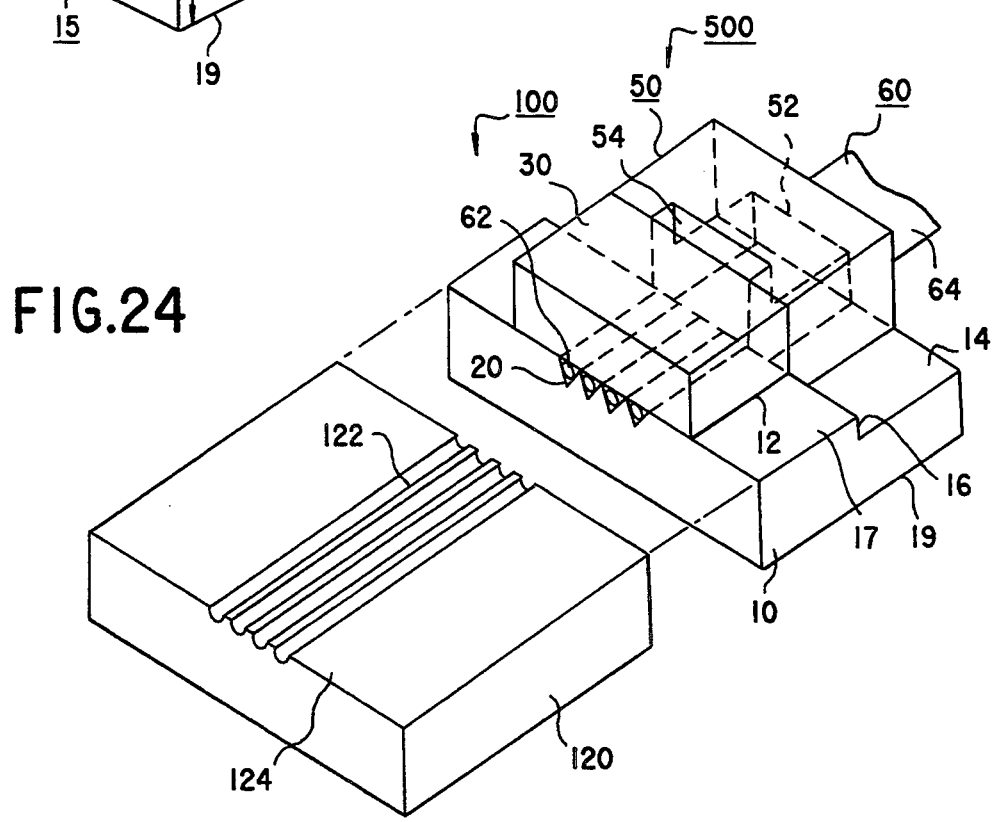

Referring to FIG. 24, an optical fiber connector 100 according to the ninth embodiment of the present invention will be explained. The optical fiber connector 100 includes a lower plate 10, an optical fiber holding plate 30 and an upper plate 50.

The lower plate 10 is provided with an upper flat surface 12, an upper flat surface 14 continuous to the upper flat surface 12 with a stepped portion 16 interposed therebetween, and a bottom surface 19. The upper flat surface 12, the upper flat surface 14 and the bottom surface 19 are formed in spaced-apart parallel relationship. The upper flat surface 14 is lower than the upper flat surface 12. The height of the stepped portion 16 (that is, the height difference between the upper flat surface 12 and the upper flat surface 14), is set to be about one half of the diameter of the covering 64 of the optical fiber cable 60, so that the optical fibers 62 are located in V-grooves 20, when the covering 64 of the optical fiber cable 60 is placed on the upper flat surface 14.

V-grooves 20 for accommodating respective optical fibers 62 of an optical fiber cable 60 are formed in the upper flat surface 12. The V-groove 20 has an opening at each end thereof.

The optical fiber holding plate 30 is adapted to firmly hold the optical fibers 62 in the V-grooves 20. The optical fiber holding plate 30 is placed onto the optical fiber 62, thereby supporting the optical fiber 62 at three points by the cooperation of the optical fiber holding plate 30 and the opposite side surfaces of the V-groove 20.

The upper plate 50 is adapted to be placed onto the upper flat surface 14 of the lower plate 10, and is provided with, in its bottom surface, an accommodation groove 52 for accommodating the covering 64 of the optical fiber cable 60. The accommodation groove 52 has an opening at its each end. An adhesive injection port 54 is formed in the upper plate 50, communicating with the accommodation groove 52.

In the present embodiment, the lower plate 10 is also provided with a reference upper flat surface 17 continuous with the upper flat surface 12. The distance between the reference upper flat surface 17 and the bottom surface 19 is the same as that between the upper flat surface 12 and the bottom surface 19. The reference upper flat surface 17 and the upper flat surface 12 have a common surface. The reference surface 17 is not covered by the optical fiber holding plate 30.

By accommodating the covering 64 of the optical fiber cable 60 in the accommodating groove 52, and by positioning the optical fibers 62 of the optical fiber cable 60 in the corresponding V-grooves 20 and firmly holding the optical fibers 62 in the corresponding V-grooves by the optical fiber holding plate 30, the optical fiber assembly 500 is fabricated.

In coupling the optical fibers 62 held in the optical fiber assembly 500 with corresponding waveguides 122 formed in the upper flat surface 124 of the waveguide plate 120, the reference upper flat surface 17 of the lower plate 10 and the upper flat surface 124 of the waveguide plate 120 are used as a positioning reference.

Specifically, as shown in FIG. 25, a method can be employed which comprises the steps of placing the reference upper flat surface 17 of the optical fiber assembly 500 and upper flat surface 124 as a reference surface 9 of the waveguide plate 120 onto a jig 130 provided with vacuum chuck bores 132, and bringing the reference upper flat surface 17 of the optical fiber assembly 500 and the upper flat surface 124 of the waveguide plate 120 into contact with a flat surface 134 of the jig 11 by utilizing vacuum. This ensures that the vertical alignment is easily performed, and therefore, centering may be conducted by moving either of the optical fiber assembly 500 or the waveguide plate 120 relative to the other in a horizontal direction on the jig 130.

In this way, in the present embodiment, V-grooved upper flat surface 12 is extended laterally to provide the reference upper flat surface 17 as a coupling reference surface. Usually, to machine V-grooves 5 in the lower plate 10, an unmachined lower plate 10 is affixed to a machining jig (not shown), and to eliminate variation of the affixing, the upper surface of the lower plate 10 is refined so that it is parallel to the bottom surface of the machining jig (not shown). Then, by setting the machining jig (not shown) with the lower plate 10 on a table of a grinding machine, V-grooves 20 whose variation in depth from the upper flat surface 12 of the lower plate 1 is ±0.3 μm or less, can be machined.

The waveguides 122 are formed in the waveguide plate 120 by a photolithographic technique, and therefore, the depth accuracy of the waveguides 122 relative to the upper flat surface 124 as a reference surface, is ±0.3 μm or less.

Thus, by aligning the reference upper flat surface 17, which is the same surface as the upper flat surface 12 in which V-grooves are defined, of the lower plate 10 with the upper flat surface 124 of the waveguide plate 120, the optical fibers 62 and the waveguides 122 are aligned with each other with high accuracy.

In an SM waveguide, the center of a field of propagated light is about 2 μm below the upper flat surface 124 of the waveguide plate 120, and therefore, the depth of the V-grooves 20 in lower plate 10 is adjusted, as shown in FIG. 26, so that the distance from the reference surface 17 to the core center 66 of the optical fiber 62 is about 2 μm in coincidence to the waveguide 122 to be coupled.

Figure 27:
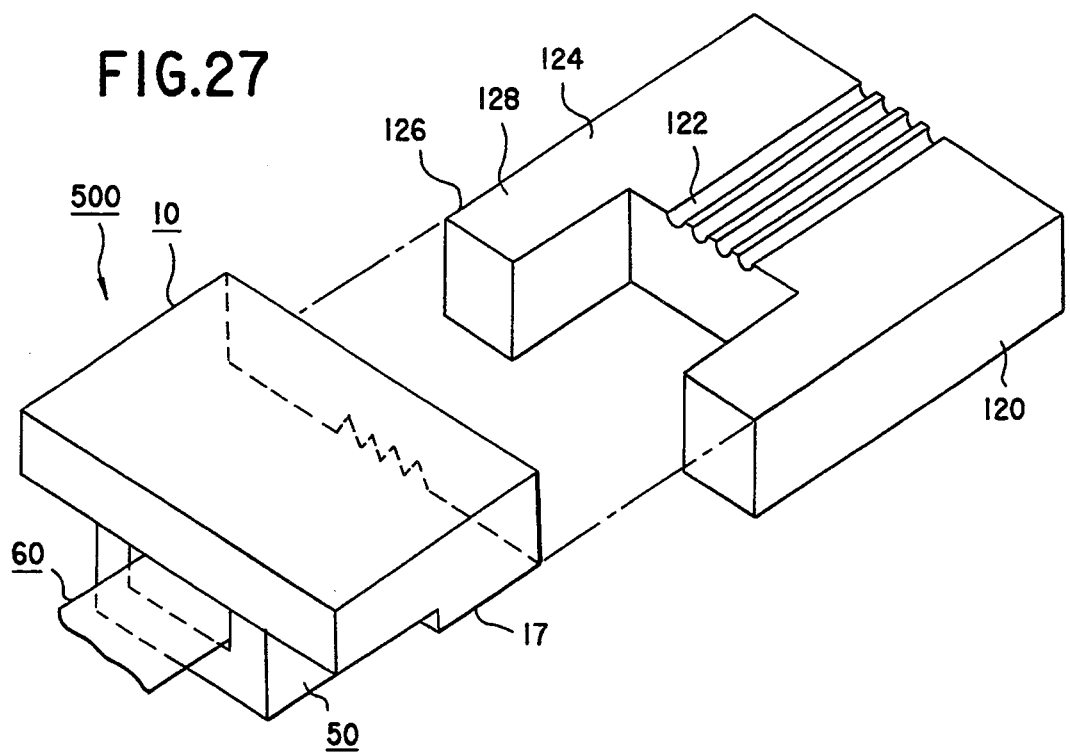
FIG. 27 is a schematic perspective view for explaining an optical fiber assembly and an optical assembly according to a tenth embodiment of the present invention.

Referring to FIG. 27, a waveguide plate 120 as a mating member is formed in a U-shaped configuration. The upper flat surface 124 is elongated to form a upper flat surface 126 of a projecting portion 126. The upper flat surface 128 of the projecting portion 126 of the waveguide plate 120 is brought into contact with a reference upper flat surface 17 of the lower plate 10. With this method, it is not necessary to use a jig 11 as illustrated in FIG. 25. Alternately, the lower plate 10 may be formed in a U-shaped configuration.

Figure 28:
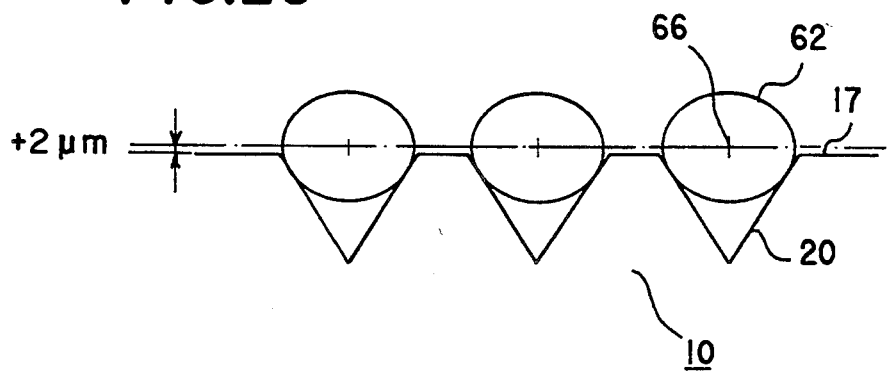
FIG. 28 is a front view for explaining an optical fiber assembly according to a tenth embodiment of the present invention.

In the embodiment shown in FIG. 27, the attitude of the waveguide plate 120 is inverted from the attitude shown in FIG. 25. Therefore, the depth of the V-grooves 20 in the lower plate 10 is adjusted, so that the position of the core center 66 of the optical fiber 60 is higher than the reference upper surface 17 by about 2 μm as shown in FIG. 28.

Figure 29:
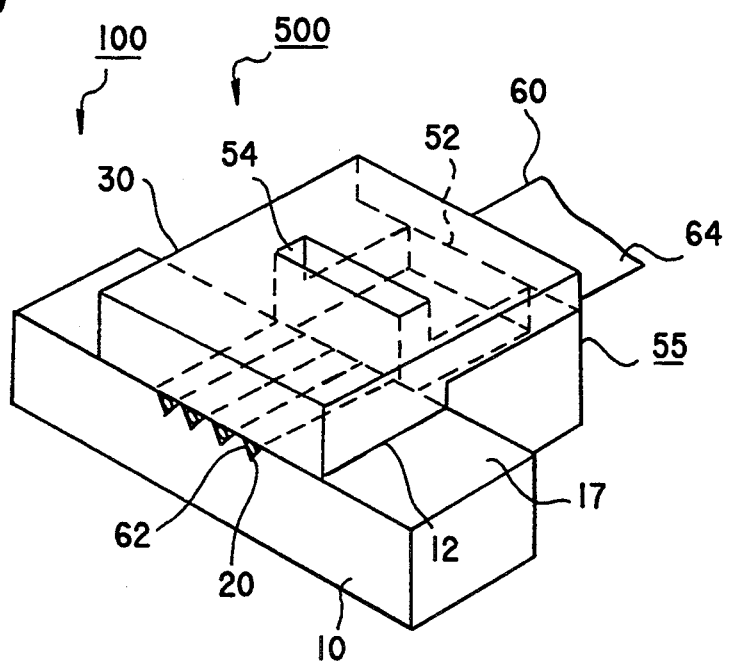
FIG. 29 is a schematic perspective view for explaining an optical fiber assembly according to an eleventh embodiment of the present invention.

Referring to FIG. 29, the optical fiber holding plate 30 is elongated backwards, and the adhesive injection groove 54 is formed in the elongated portion of the optical fiber holding plate 30. A plate 55 having the accommodation groove 52 for accommodating the covering 64 of the optical fiber cable 60 is disposed under the optical fiber holding plate 30.

Figure 30:
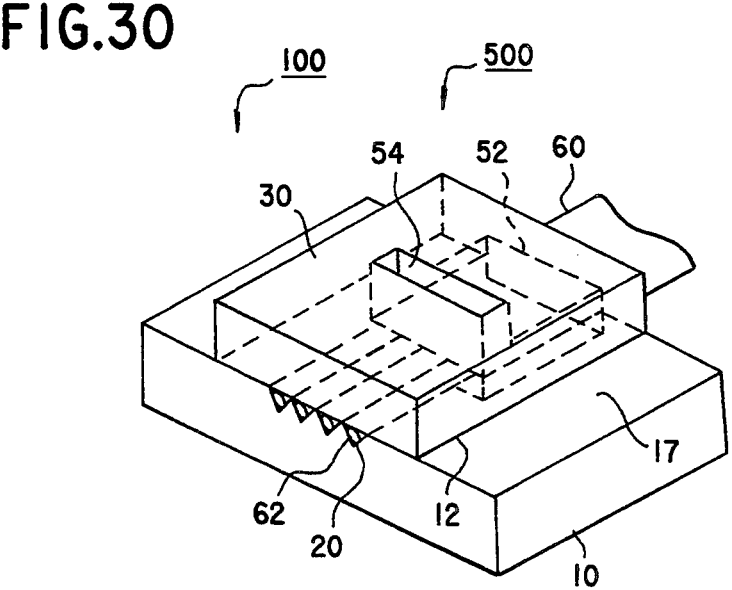
FIG. 30 is a schematic perspective view for explaining an optical fiber assembly according to a twelfth embodiment of the present invention.

Referring to FIG. 30, both the optical fiber holding plate 30 and the lower plate 10 are elongated backward. The adhesive injection groove 54 is formed in the elongated portion of the optical fiber holding plate 30. The accommodation groove 52 for accommodating the covering 64 of the optical fiber cable 60 is formed in the elongated portion of the lower plate 10.

In both optical fiber connectors 100 of FIGS. 29 and 30, V-grooved upper flat surface 12 is elongated laterally to provide the reference upper flat surface 17 as a coupling reference surface. Therefore, the optical fiber assemblies 500 of FIGS. 29 and 30 can be coupled with a mating member such as the waveguide plate 120 in the above-described manner by utilizing the reference upper flat surface 17.

In the above-explained ninth to twelfth embodiments, the optical fiber assembly 500 is coupled with the waveguide plate 120 as a mating member by using the reference upper flat surface 17 formed by elongating the V-grooved upper flat surface 12 of the lower plate 10. Therefore, the alignment of the optical fiber assembly with the mating member, such as the waveguide plate 120, can be correctly performed without depending on the accuracy of the thickness of lower plate 10 and the optical fiber holding plate 30. This coupling method is similar to the above-described third method for performing the alignment on the basis of a surface, and advantageously does not require the complicated system of the first method and the guide grooves of the second method.

What is claimed is:

1. An optical fiber holder for coupling at least one optical fiber to an external optical element, said connector comprising:
   a lower plate having a first upper flat surface, a second upper flat surface being lower than said first upper flat surface, and a stepped portion interposed between said first and second upper flat surfaces and having a transversely-extending side surface;
   a first upper plate having a flat bottom surface,
   at least one longitudinally-extending V-groove, formed in one of said first upper flat surface of said lower plate and said bottom surface of said first upper plate said V-groove having at least one longitudinally extending side wall for receiving therein respective corresponding optical fibers with each of said fibers being stripped of a fiber covering, said first upper plate being positioned on said first upper flat surface to press said each optical fiber against said at least one side wall of said respective V-grooves; and
   a second upper plate provided with a flat bottom face and a receiving groove formed in said bottom face and having an opening at each end thereof, for tightly holding therein said optical fibers covered with said fiber coverings, said second upper plate having an end surface and being positionable on said second upper flat surface of said lower plate so that said optical fibers are insertable straight into respective said V-grooves through said receiving groove and said end surface contacts said side surface of said stepped portion.

2. An optical fiber holder as recited in claim 1, wherein said first upper plate is an optical fiber receiving plate having said at least one V-groove in said bottom flat surface.

3. An optical fiber holder as recited in claim 1, wherein said second upper plate further includes an adhesive injection groove communicating with said receiving groove.

4. An optical fiber holder as recited in claim 1, wherein said lower plate further includes a reference upper flat surface, said first upper flat surface and said reference upper flat surface having the same surface.

5. A method of manufacturing an optical fiber holder, comprising the steps of:
   (a) preparing a wafer having a first upper flat surface;
   (b) forming, in said first upper flat surface, a plurality of groups of longitudinally-extending V-grooves, each V-groove for receiving respective corresponding optical fibers of optical fiber cables;
   (c) forming, in said first upper flat surface, a second upper flat surface and a stepped portion, said second upper flat surface being lower than said first upper flat surface, said stepped portion having a side surface, and said side surface being interposed between said first and second upper flat surfaces;
   (d) forming an integral upper plate formed to fit to said side surface of said stepped portion and to said second upper flat surface;

(e) forming, in said integral upper plate, a plurality of receiving grooves respectively corresponding to said plurality of groups of longitudinally-extending V-grooves, for receiving respective corresponding covering of said optical fiber cables, each said receiving groove having an opening at each end thereof;

(f) positioning and securing said integral upper plate on said second upper flat surface; and (g) cutting said integral upper plate and said wafer together at least in parallel to the extending direction of said V-grooves, so as to form a plurality of optical fiber holder frames respectively having a lower plate provided with said first upper flat surface in which said V-grooves are formed, said second upper flat surface and said stepped portion interposed between said first and second upper flat surfaces, and an upper plate secured on said second upper flat surface and having said receiving groove.

6. A method of manufacturing an optical fiber assembly, comprising the steps of:

(a) preparing a wafer having a first upper flat surface;

(b) forming, in said first upper flat surface, a plurality of groups of longitudinally-extending V-grooves for receiving respective corresponding optical fibers of optical fiber cables;

(c) forming, in said first upper flat surface, a second upper flat surface and a stepped portion, said second upper flat surface being lower than said first upper flat surface, said stepped portion having a side surface, and said side surface being interposed between said first and second upper flat surfaces;

(d) forming an integral upper plate formed to fit to said side surface of said stepped portion and to said second upper flat surface;

(e) forming, in said integral upper plate, a plurality of receiving grooves respectively corresponding to said plurality of groups of longitudinally-extending V-grooves, for receiving respective corresponding optical fiber cables covered with respective fiber coverings, each said receiving groove having an opening at each end thereof;

(f) positioning and securing said integral upper plate on said second upper flat surface;

(g) respectively inserting optical fiber cables into corresponding said receiving groove and positioning said optical fiber in said corresponding V-groove;

(h) securely holding said optical fibers in said corresponding V-grooves by at least one optical fiber holding plate, so as to form an integral optical fiber holding assembly block;

(i) subjecting said assembly block to an end face polishing treatment;

(j) cutting said assembly block at least in parallel to the extending direction of said V-grooves, so as to form a plurality of optical fiber assemblies.

* * * * *